(12) United States Patent
Berlinguette et al.

(10) Patent No.: US 10,173,210 B2
(45) Date of Patent: Jan. 8, 2019

(54) PROCESS FOR NEAR-INFRARED-DRIVEN DECOMPOSITION OF METAL PRECURSORS FOR THE FORMATION OF AMORPHOUS METAL AND METAL OXIDE FILMS

(71) Applicant: Click Materials Corp., Vancouver, British Columbia (CA)

(72) Inventors: Curtis Berlinguette, Calgary (CA); Danielle Salvatore, Vancouver (CA); Kevan Dettlebach, Vancouver (CA); Jesse Hudkins, Vancouver (CA)

(73) Assignee: Click Materials Corp., Vancouver, British Columbia (CA)

( * ) Notice: Subject to any disclaimer, the term of this patent is extended or adjusted under 35 U.S.C. 154(b) by 0 days.

(21) Appl. No.: 15/539,074

(22) PCT Filed: Dec. 21, 2015

(86) PCT No.: PCT/CA2015/051354
§ 371 (c)(1),
(2) Date: Jun. 22, 2017

(87) PCT Pub. No.: WO2016/101067
PCT Pub. Date: Jun. 30, 2016

(65) Prior Publication Data
US 2017/0368545 A1    Dec. 28, 2017

Related U.S. Application Data

(60) Provisional application No. 62/095,123, filed on Dec. 22, 2014.

(51) Int. Cl.
*B01J 23/652*    (2006.01)
*B01J 23/72*    (2006.01)
(Continued)

(52) U.S. Cl.
CPC .......... *B01J 35/0033* (2013.01); *B01J 23/08* (2013.01); *B01J 23/14* (2013.01); *B01J 23/24* (2013.01);
(Continued)

(58) Field of Classification Search
CPC ... B01J 23/08; B01J 23/14; B01J 23/24; B01J 23/28; B01J 23/30; B01J 23/34;
(Continued)

(56) References Cited

U.S. PATENT DOCUMENTS 2,932,592 A * 4/1960 Cameron ............ C23C 14/0021
359/359
3,202,054 A * 8/1965 Mochel .................. G02B 5/208
359/360
(Continued)

FOREIGN PATENT DOCUMENTS

WO    2013/029186 A1    3/2013

OTHER PUBLICATIONS

International Search Report (PCT/CA2015/051354); dated Mar. 8, 2016.
(Continued)

*Primary Examiner* — Patricia L. Hailey
(74) *Attorney, Agent, or Firm* — Howard & Howard Attorneys PLLC

(57) ABSTRACT

The present invention provides a method for making materials and electrocatalytic materials comprising amorphous metals or metal oxides. This method provides a scalable preparative approach for accessing state-of-the-art electrocatalyst films, as demonstrated herein for the electrolysis of water, and extends the scope of usable substrates to include those that are non-conducting and/or three-dimensional electrodes.

15 Claims, 27 Drawing Sheets

(51) Int. Cl.
| | | |
|---|---|---|
| *B01J 23/74* | (2006.01) | |
| *B01J 23/89* | (2006.01) | |
| *B01J 37/34* | (2006.01) | |
| *B01J 35/00* | (2006.01) | |
| *C25B 11/04* | (2006.01) | |
| *C25B 9/10* | (2006.01) | |
| *B01J 37/02* | (2006.01) | |
| *B01J 23/08* | (2006.01) | |
| *B01J 23/14* | (2006.01) | |
| *B01J 23/24* | (2006.01) | |
| *B01J 23/34* | (2006.01) | |
| *B01J 23/46* | (2006.01) | |
| *B01J 23/70* | (2006.01) | |
| *B01J 23/745* | (2006.01) | |
| *B01J 23/75* | (2006.01) | |
| *C25B 1/04* | (2006.01) | |
| *H01M 4/90* | (2006.01) | |
| *B01J 37/12* | (2006.01) | |
| *B01J 27/135* | (2006.01) | |

(52) U.S. Cl.
CPC .............. *B01J 23/34* (2013.01); *B01J 23/46* (2013.01); *B01J 23/70* (2013.01); *B01J 23/745* (2013.01); *B01J 23/75* (2013.01); *B01J 37/0215* (2013.01); *B01J 37/0219* (2013.01); *B01J 37/344* (2013.01); *C25B 1/04* (2013.01); *C25B 9/10* (2013.01); *C25B 11/0442* (2013.01); *C25B 11/0447* (2013.01); *H01M 4/9016* (2013.01); *B01J 27/135* (2013.01); *B01J 37/12* (2013.01); *Y02E 60/366* (2013.01)

(58) Field of Classification Search
CPC ........ B01J 23/462; B01J 23/652; B01J 23/72; B01J 23/74; B01J 23/745; B01J 23/75; B01J 23/89; B01J 35/004; B01J 35/0033; B01J 37/08; B01J 37/34; B01J 37/0215; B01J 37/344; C25B 1/04; C25B 11/0447
USPC ... 502/5, 313, 315, 316, 318, 324–326, 331, 502/337, 338, 101; 427/493, 508, 542, 427/553, 557, 559, 584; 264/462, 492
See application file for complete search history.

(56) References Cited

U.S. PATENT DOCUMENTS

| | | | | |
|---|---|---|---|---|
| 3,514,175 | A * | 5/1970 | Jenkins | G02B 5/208 126/908 |
| 3,794,496 | A * | 2/1974 | Manhardt | G03C 1/498 430/264 |
| 5,534,312 | A * | 7/1996 | Hill | C23C 18/14 427/270 |
| 6,777,036 | B2 * | 8/2004 | Bravo Vasquez | C23C 18/14 427/533 |
| 7,879,748 | B2 * | 2/2011 | Marti | B01D 53/945 204/157.15 |
| 2008/0146440 | A1 * | 6/2008 | Westin | B01J 23/755 502/335 |
| 2012/0156827 | A1 * | 6/2012 | Michael | H01L 21/428 438/95 |
| 2014/0135209 | A1 * | 5/2014 | Kaburagi | B01J 23/30 502/318 |
| 2014/0213441 | A1 * | 7/2014 | Trudel | B01J 23/745 502/304 |

OTHER PUBLICATIONS

Written Opinion (PCT/CA2015/051354); dated Mar. 8, 2016.
Smith et al., Photochemical route for accessing amorphous metal oxide materials for water oxidation catalysis, Science, vol. 340, pp. 60-63, Apr. 5, 2013.

* cited by examiner

PROCESS FOR NEAR-INFRARED-DRIVEN DECOMPOSITION OF METAL PRECURSORS FOR THE FORMATION OF AMORPHOUS METAL AND METAL OXIDE FILMS

CROSS-REFERENCE TO THE RELATED APPLICATION(S)

The present application is the National Stage of International Patent Application No. PCT/CA2015/051354, filed on Dec. 21, 2015, which claims the benefit of U.S. Provisional Patent Application, Ser. No. 62/095,123, filed Dec. 22, 2014, the entire disclosure of which are hereby incorporated by reference.

FIELD OF THE INVENTION

The present invention pertains to the field of metal-containing films and their uses, in particular films prepared using near-infrared radiation.

BACKGROUND

Amorphous metal and metal oxide films are pervasive in myriad applications [e.g., transistors (1, 2), flexible electronics (3)], including schemes that involve the electrocatalytic oxidation of water into clean hydrogen fuels. Indeed, there is a growing body of evidence showing that amorphous metal oxides mediate the oxygen evolution reaction (OER; Eq. 1) (4-8) and hydrogen evolution reaction (HER; Eq. 2) (9, 10) more efficiently than crystalline phases of the same compositions.

$$2H_2O_{(l)} \rightarrow 4e^- + 4H^+_{(aq)} + O_{2(g)} \quad (1)$$

$$2H^+_{(aq)} + 2e^- \rightarrow H_{2(g)} \quad (2)$$

These findings are particularly important in the context of efficiently storing electricity produced from intermittent and variable renewable energy sources (e.g., sunlight, wind) as high density fuels (e.g., hydrogen) (11, 12).

The majority of amorphous metal oxide films reported in the literature are formed by electrodeposition (4-7), sputtering (13), thermal decomposition (3, 14), or ultra-violet-light-driven decomposition (8) of metal precursors. Films prepared by these methods can demonstrate state-of-the-art electrocatalytic OER activities (15-20), the syntheses are not necessarily amenable to scalable manufacture due so sensitivities to metal work functions, reaction media, or prohibitively expensive precursors.

Consequently, accessing amorphous compositions of many metal oxides for commercial applications is not trivial, particularly when complex metal compositions are desired (3, 8).

The isolation of amorphous metals is substantially more challenging, as single-element metallic films typically require sophisticated protocols (21).

There is therefore a need for processes for the formation of amorphous metal-containing films under moderate conditions.

SUMMARY OF THE INVENTION

An object of the present invention is to provide a process for near-infrared-driven decomposition of metal precursors for the formation of amorphous metal and metal oxide films. In accordance with an aspect of the present invention, there is provided a process for forming an amorphous metal-containing electrocatalytic film, the process comprising the steps of: a) providing a substrate; b) coating the substrate with a metal precursor solution; and c) exposing the coated substrate to near-infrared radiation to form the amorphous metal-containing film.

In accordance with another aspect of the present invention, there is provided an electrocatalytic material suitable for use in electrocatalysis formed by the process in accordance with the present invention.

DETAILED DESCRIPTION OF THE INVENTION

Figure 1:
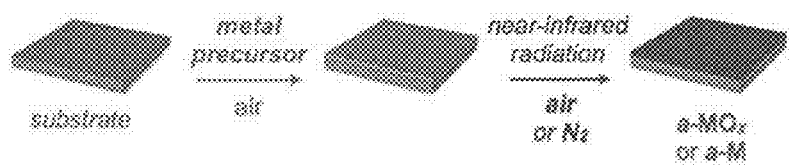
FIG. 1 is a schematic representation of the NIRDD of a metal precursor on a substrate leading to the formation of amorphous metal oxide ($\alpha$-MO$_x$) and reduced metal ($\alpha$-M) films under air and nitrogen, respectively, in accordance with the present invention.

The present disclosure relates to a new process for generating thin films of amorphous metals and metal oxides through the exposure of transition metal precursors (e.g., a metal salt or a metal coordination complex) to near-infrared (NIR) radiation under inert and aerobic environments, respectively. FIG. 1 is a schematic representation of the NIR-driven decomposition (NIRDD) of a metal precursor on a substrate leading to the formation of amorphous metal oxide (α-MO$_x$) and reduced metal (α-M) films under air and nitrogen, respectively. Not only does this NIRDD process furnish amorphous metal oxide films that display properties commensurate with films prepared by more complex methods and precursors, it is compatible with curing techniques widely used in large-scale manufacturing processes, including roll-to-roll processing (22, 23). The NIRDD method therefore provides unprecedented access to amorphous phases of reduced metals and alloys using moderate experimental conditions.

The finding that amorphous metal or metal oxide films can be prepared by merely exposing metal precursors (e.g., a metal salt or a metal coordination complex) coated on a substrate to NIR radiation represents an important breakthrough for the scalable manufacture of state-of-the-art electrocatalysts and other thin-film applications.

The NIRDD process of the present invention provides easy access to complex compositions of alloys and metal oxide films in the amorphous phases, on a much broader substrate scope than is available to other commonly used methods.

In embodiments of the invention, the amorphous metal-containing film is an amorphous metal oxide, an amorphous mixed metal oxide, an amorphous metal, or an amorphous mixed metal.

In accordance with the present invention, the amorphous metal-containing film comprises a metal which is selected from any transition metal. In preferred embodiments of the present invention, the metal is selected from iron, iridium, manganese, nickel, copper, ruthenium, cobalt, tungsten, indium, tin, molybdenum or any combination thereof. Also suitable for use in the present invention are metals from Groups 1 to 12, Rows 2 to 6, and any element from Groups 13 to 16, Rows 2 to 6.

In one embodiment, the metal precursor solution is a solution of a metal salt. Nonlimiting examples of suitable metal salts include MCl$_x$ or M(NO$_3$)$_x$, where M is a metal selected from iron, iridium, manganese, nickel, copper, ruthenium, cobalt, tungsten, indium, tin, molybdenum or any combination thereof, and x is an integer from 1 to 6. Accordingly, nonlimiting examples of suitable metal precursors include FeCl$_3$, Fe(NO$_3$)$_3$, IrCl$_3$, NiCl$_2$, Ni(NO$_3$)$_2$, Fe$_2$Ni$_3$Cl, CoCl$_2$, RuCl$_3$, CuCl$_2$, and WCl$_6$.

In one embodiment, the metal precursor solution is a solution of a metal coordination complex. Nonlimiting examples of ligands suitable for use in the metal coordination complexes are 2-ethylhexanoate ligands [eh] or acetylactonate [acac] ligands. Accordingly, nonlimiting examples of suitable metal precursors include Fe(eh)$_3$, Cu(eh)$_2$, Ir(acac)$_3$, Ni(eh)$_2$, Mn(eh)$_3$, Co(eh)$_2$, Mo(eh)$_2$, Sn(eh)$_2$, In(acac)$_3$, and Fe$_2$Ni$_3$(eh)$_3$.

In one embodiment, the process is carried out in an inert atmosphere such as nitrogen, or any other inert, non-oxidizing gas, which favorably allows for the formation of amorphous metal or amorphous mixed metal (or metal alloy) films. Accordingly, non-limiting examples of amorphous metal-containing films which can be obtained using the process of the present invention include α-Fe, α-Cu, α-Fe$_2$Ni$_3$, α-Ni, and α-Mn.

In one embodiment, the process is carried out in an oxidizing (i.e., oxygen containing) atmosphere (e.g., air), which favorably allows for the formation of amorphous metal oxide or mixed metal oxide films. Accordingly, non-limiting examples of amorphous metal oxide or mixed metal oxide films which can be obtained using the process of the present invention include α-FeO$_x$, α-IrO$_x$, α-NiO$_x$, α-MnO$_x$, α-Fe$_2$Ni$_3$O$_x$, α-CuO$_x$, α-CoO$_x$, α-MoO$_x$, α-SnO$_x$, α-InO$_x$, α-RuO$_x$, and α-WO$_x$.

The process of the present invention allows for the formation of amorphous metal-containing films on a wide variety of substrates. Nonlimiting examples of suitable substrates include glass, fluorine-doped tin oxide-coated glass (FTO), synthetic polymers (e.g., Nafion®), metallic substrates (e.g., nickel, platinum, gold, silver, copper or titanium), plastic, glassy carbon and stainless steel.

In one embodiment, the process for forming an amorphous metal-containing film for use in electrocatalysis further comprises a step of tuning the properties of the electrocatalyst. In one embodiment, the tuning step comprises annealing the metal oxide film.

The NIRDD process of the present invention is also easy to scale on the basis that the infrastructure requirements are similar to curing processes currently used in industry (22, 23).

In addition, the NIRDD fabrication process is also compatible with substrates that are non-conducting, three-dimensional, and sensitive to temperature and UV radiation, for example, Nafion®. In accordance with the present invention, the process allows the formation of an amorphous metal-containing film on a substrate, thereby providing a material suitable for use in electrocatalysis.

The NIRDD process of the present invention can be used for the formation of amorphous (oxide) films containing metals of relevance to the OER reaction [e.g., iron (7, 8), iridium (18, 24), manganese (6, 25), nickel (7, 8, 26), copper (27, 28)].

EXAMPLES

Example 1

Novel Synthesis of Metal Oxides ($MO_x$) Using IR Irradiation

Figure 6:
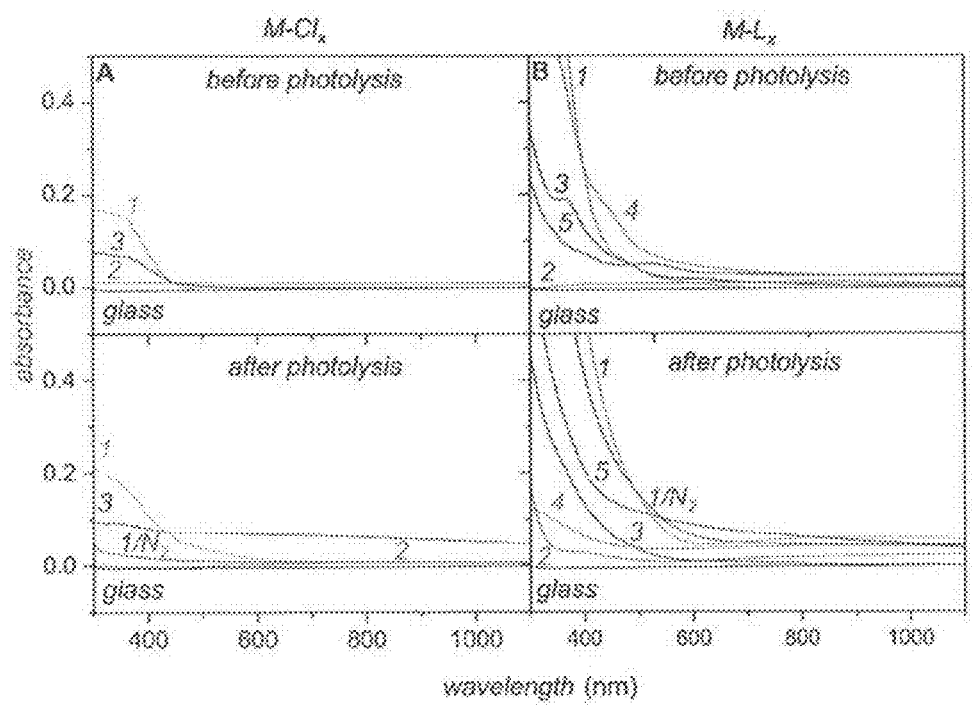
FIGS. 6A and B illustrate UV-vis absorption spectra, before and after being subjected to the NIRDD process of the present invention, of: (A) various metal halide precursor complexes on glass and (B) various coordination complexes on glass.
Figure 7:
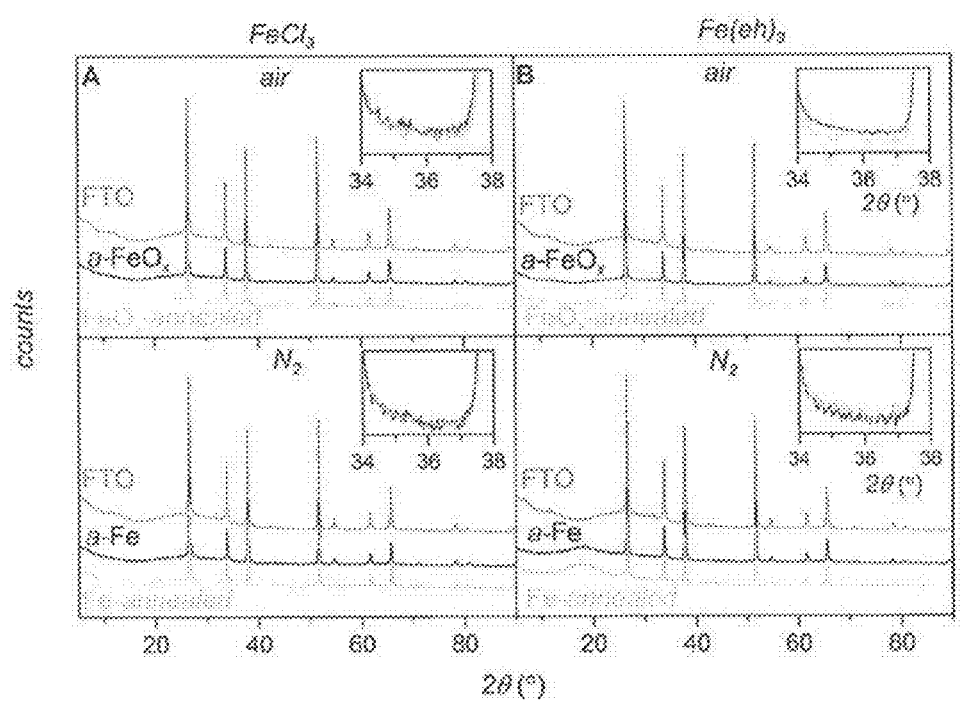
FIGS. 7A and B illustrate powder XRD patterns acquired on as-prepared and annealed (T$_{anneal}$=500° C.) $\alpha$-FeO$_x$ and $\alpha$-Fe films prepared by applying the NIRDD process of the present invention to (A) FeCl$_3$ and (B) Fe(eh)$_3$ deposited on FTO under air and nitrogen, respectively.

The formation of amorphous metal oxide films upon exposure of metal salts to NIR radiation was confirmed by placing $FeCl_3$ spin-cast on FTO, $FeCl_3$/FTO, under a 175-W NIR lamp for 120 min in an aerobic environment. The color change from yellow to light brown upon irradiation supported the formation of iron oxide (UV-vis spectra are provided in FIG. 6), while the absence of reflections in the powder XRD patterns indicated the amorphous nature of the material (FIG. 7). FIG. 7 illustrates powder XRD patterns required on as-prepared and annealed ($T_{anneal}$=500° C.) α-$FeO_x$ and α-Fe films prepared by applying the NIRDD process to (A) $FeCl_3$ and (B) $Fe(eh)_3$ deposited on FTO under air and nitrogen, respectively. Data recorded on a bare FTO substrate is also provided. Inset: Expanded view highlighting the region where the reflection associated with the maghemite and hematite form of $Fe_2O_3$ at 35.5° is observed. This reflection is observed only for the films annealed at 500° C. under air, denoted $FeO_x$-annealed. (A signature Bragg reflection of hematite is apparent at 2θ=35.9° only after annealing the same film in air for 1 h at 500° C.) FIG. 6 illustrates UV-vis absorption spectra, before and after being subjected to the NIRDD process, of: (A) metal halide precursor complexes on glass, $FeCl_3$/glass (1), $NiCl_2$/glass (2), and $Fe_2Ni_3Cl$/glass (3); and (B) coordination complexes on glass, $Fe(eh)_3$/glass (1), $Ni(eh)_3$/glass (2), $Fe_2Ni_3(eh)_3$/glass (3), $Ir(acac)_3$/glass (4) and $Mn(eh)_3$/glass (5). Data for $FeCl_3$/glass and $Fe(eh)_3$/glass following the NIRDD process in a nitrogen environment is indicated by "1/$N_2$", respectively. The glass background is also shown. Note that glass was used rather than FTO to avoid interference at longer wavelengths. The film $Fe_2Ni_3Cl$/glass was prepared from a solution of 2 g of deionized water containing $NiCl_2$ (0.088 g) and $FeCl_3$ (0.039 g) that was spin-cast onto a glass substrate.

Figure 29:
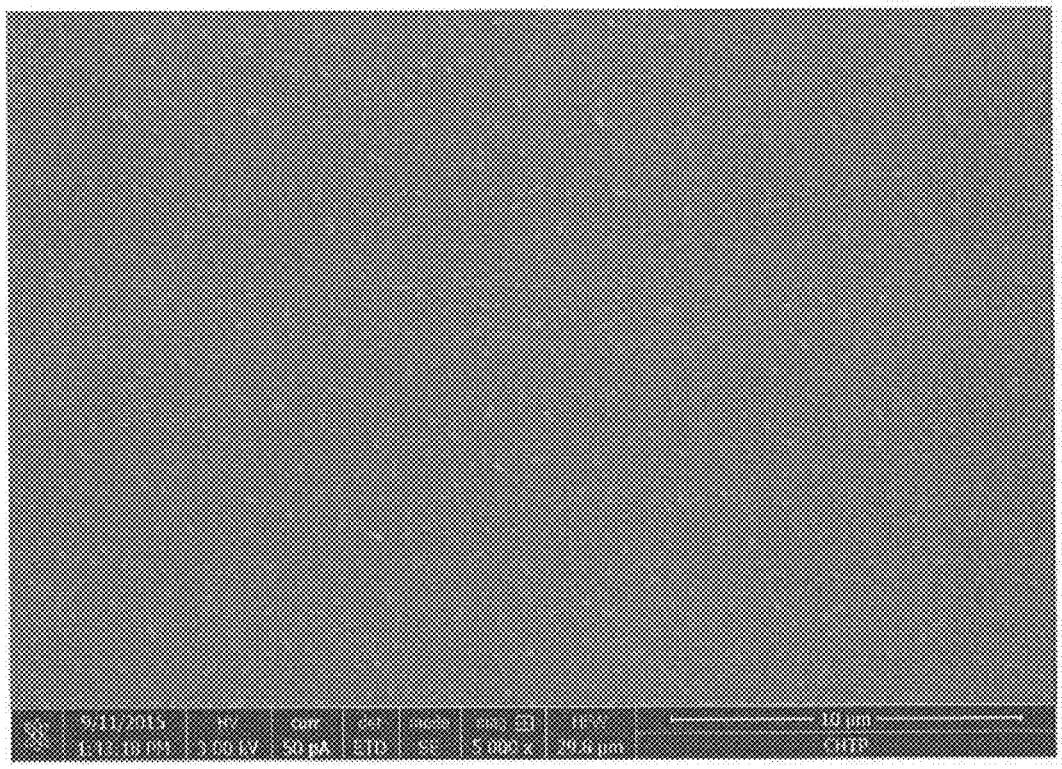
FIG. 29 illustrates an SEM image of FeO$_x$ prepared in accordance with one embodiment of the present invention.

FIG. 29 is an SEM image of $FeO_x$ prepared according to this process.

Figure 2:
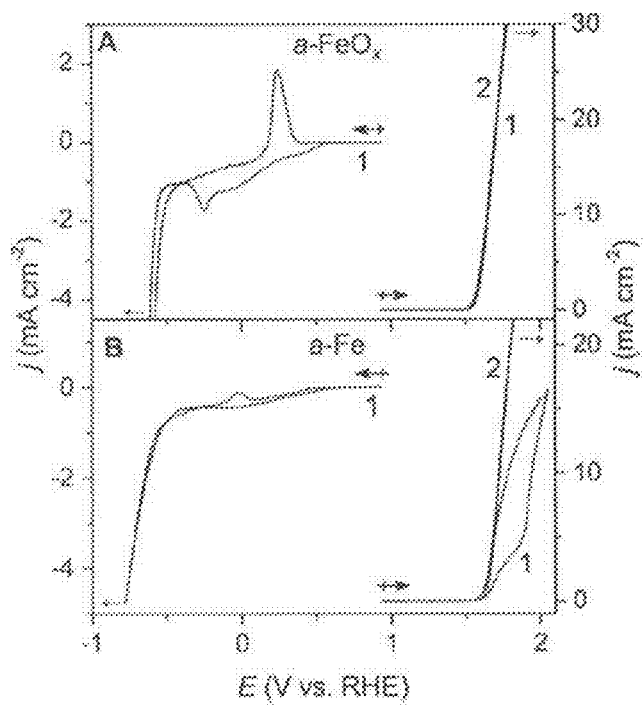
FIGS. 2A and B illustrate cyclic voltammograms for thin films of (A) $\alpha$-FeO$_x$ and (B) $\alpha$-Fe on FTO, prepared in accordance with the present invention.
Figure 8:
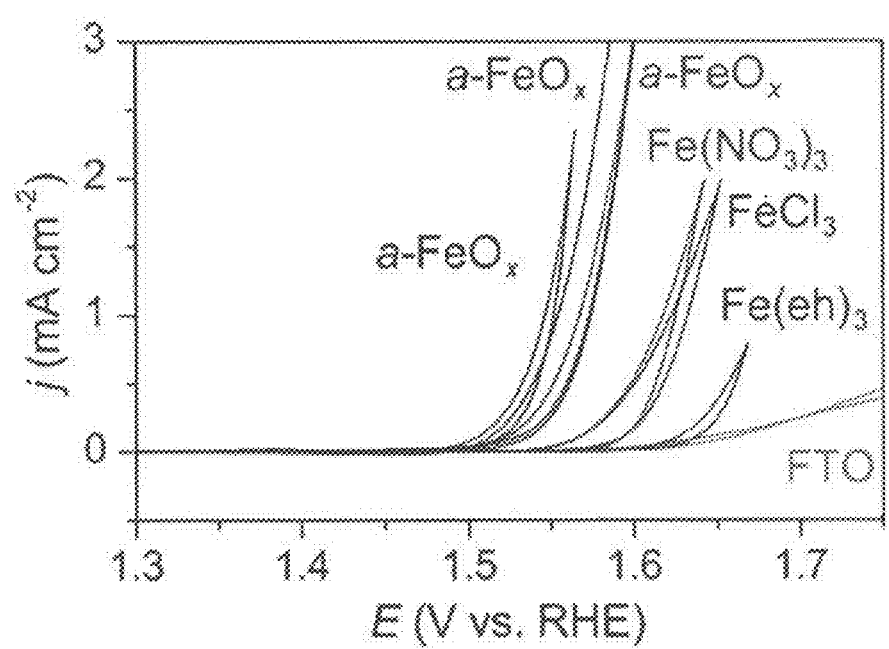
FIG. 8 illustrates cyclic voltammograms for thin films of $\alpha$-FeO$_x$, prepared by the NIRDD process in air, and the respective precursor films from which they were derived.
Figure 9:
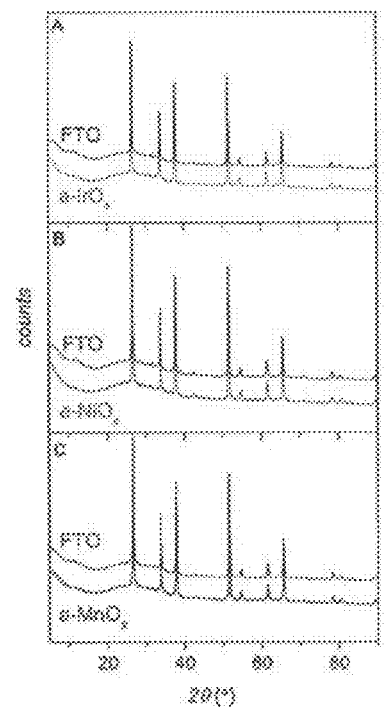
FIGS. 9A-C illustrate powder XRD patterns acquired on as-prepared films of (A) $\alpha$-IrO$_x$, (B) $\alpha$-NiO$_x$ and (C) $\alpha$-MnO, on FTO.
Figure 10:
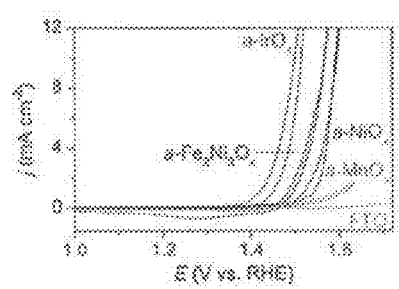
FIG. 10 illustrates cyclic voltammograms recorded on thin films of $\alpha$-IrO$_x$, $\alpha$-NiO$_x$, $\alpha$-MnO$_x$ and $\alpha$-Fe$_2$Ni$_3$O$_x$ on FTO.

The electrochemical behavior of this amorphous film, α-$FeO_x$, in aqueous media was also consistent with previous accounts of amorphous iron oxide (FIG. 2, Table 1). FIG. 2 illustrates cyclic voltammograms for thin films of α-$FeO_x$ (FIG. 2A) and α-Fe (FIG. 2B) on FTO. Values indicate the sequence of the cycles that were recorded (experimental conditions: counter-electrode=Pt mesh; reference electrode=Ag/AgCl, KCl (sat'd); scan rate=10 mV s$^{31\ 1}$; electrolyte=0.1 M KOH (aq)). Importantly, an extensive electrochemical analysis indicated that α-$FeO_x$ could be readily produced from other iron compounds [e.g., $Fe(NO_3)_3$, $Fe(eh)_3$; eh=2-ethylhexanoate] (FIG. 8), and that the NIRDD method translated effectively to other metals: Films of α-$IrO_x$, α-$NiO_x$, and α-$MnO_x$ were also formed when the corresponding metal compounds were subjected to NIR radiation (FIGS. 9 and 10). The electrocatalytic properties of α-$IrO_x$ in 1 M $H_2SO_4$ (FIG. 10), a rare acid-stable OER catalyst, are consistent with literature values, as are those for α-$NiO_x$ and α-$MnO_x$, OER electrocatalysts pervasive in the contemporary literature owing to their high activities and high natural abundances, in alkaline conditions (Table 1). FIG. 8 illustrates cyclic voltammograms for thin films of α-$FeO_x$, prepared by the NIRDD process in air, and the respective precursor films from which they were derived from; $Fe(NO_3)_3$, $FeCl_3$ and $Fe(eh)_3$ precursors. All data is collected on films deposited on FTO, and thus the slight differences in the response of the α-$FeO_x$ films are attributed to minor differences in film roughness or film densities. Electrochemistry conditions: counterelectrode=Pt mesh; reference electrode=Ag/AgCl, KCl (sat'd); scan rate=10 mV s$^{-1}$; electrolyte=0.1 M $KOH_{(aq)}$; current densities were corrected for uncompensated resistance. FIG. 9 illustrates powder XRD patterns acquired on as-prepared films of (A) α-$IrO_x$, (B) α-$NiO_x$ and (C) α-$MnO_x$ on FTO. No reflections are observed other than those associated with FTO. FIG. 10 illustrates cyclic voltammograms recorded on thin films of α-$IrO_x$, α-$NiO_x$, α-$MnO_x$ and α-$Fe_2Ni_3O_x$ on FTO. Data recorded on bare FTO is also shown. Electrochemistry conditions: counterelectrode=Pt mesh; reference electrode=Ag/AgCl, KCl (sat'd); scan rate=10 mV s$^{-1}$; electrolyte=1 M $H_2SO_{4(aq)}$ for α-$IrO_x$, or 0.1 M $KOH_{(aq)}$ for α-$NiO_x$, α-$MnO_x$, α-$Fe_2Ni_3O_x$ and bare FTO. Current densities were corrected for uncompensated resistance.

TABLE 1

Benchmarked OER Activities of a-$MO_x$ Films.

| sample* | onset η (V vs RHE) | Tafel slope (mV dec$^{-1}$) | $η_{10\ mA/cm^2}$ (V) [†] this work | literature |
|---|---|---|---|---|
|  | 0.32 | 35 | 0.42 | — |
|  |  |  | 0.24[‡] | 0.40[‡] (16) |
| a-$NiO_x$ | 0.21 | 62 | 0.36 | 0.36 (15) |
| a-$Fe_2Ni_3O_x$ | 0.19 | 34 | 0.33 | 0.35[§] (15) |
| a-$MnO_x$ | 0.22 | 167 | 0.43[‡] | 0.56[‡] (16) |
| a-$IrO_x$ | 0.08 | 47 | 0.26 | 0.26 (15) |

*$O_x$ is broadly defined as oxo/oxyl/hydroxo.
[†] Overpotential required to reach 10 mA/cm$^2$, unless otherwise indicated, without correcting for mass transport.
[‡] Overpotential required to reach 1 mA/cm$^2$; we are not aware of any value reported at 10 mA/cm$^2$.
[§] Corresponds to $FeNiO_x$. All potentials in this manuscript are expressed versus a reversible hydrogen electrode, RHE.

The discovery that NIRDD could drive α-MO$_x$ formation was not expected given the low absorptivity of the films at λ>600 nm (FIG. 6). It is therefore contended that the efficacy of the process is due to localized heating of the film rather than a photochemical effect.

Figure 5:
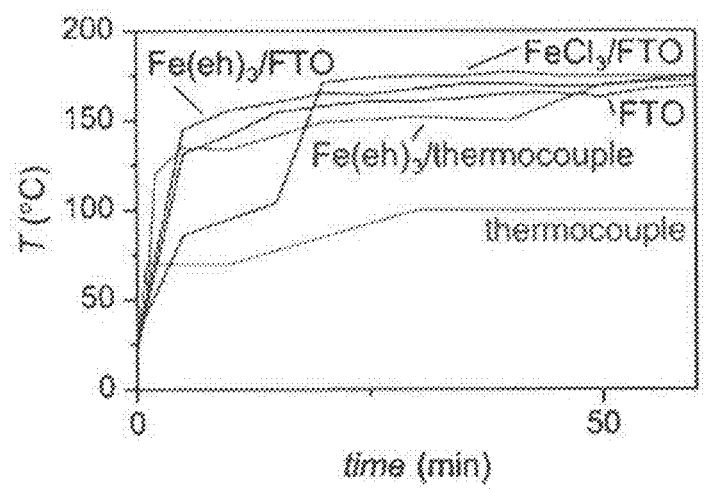
FIG. 5 illustrates temperature profiles of FeCl$_3$/FTO, Fe(eh)$_3$/FTO and bare FTO.
Figure 11:
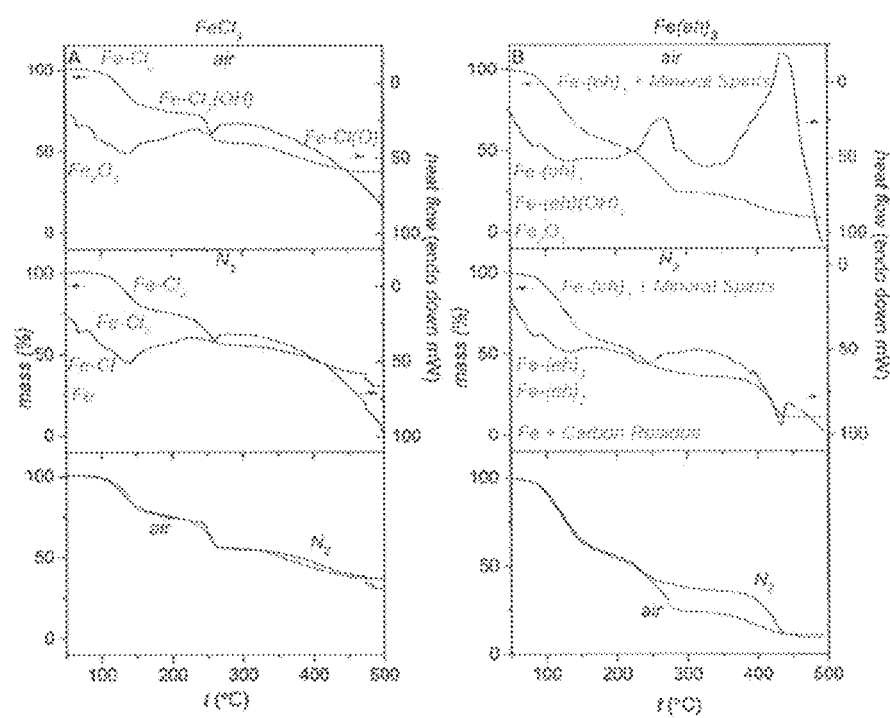
FIGS. 11A and B illustrate Thermogravimetric Analysis (TGA) and Differential Scanning Calorimetry (DSC) profiles for (A) FeCl$_3$ and (B) Fe(eh)$_3$ under air and N$_2$ at a ramp rate of 10° C. min$^{-1}$.
Figure 12:
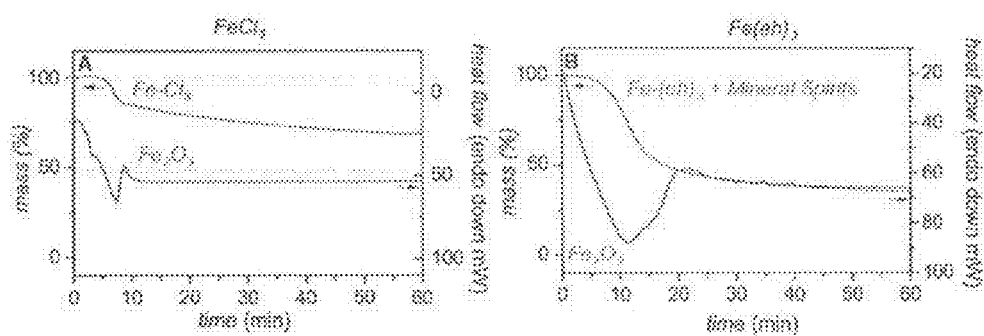
FIGS. 12A and B illustrate TGA and DSC profiles for (A) FeCl$_3$ and (B) Fe(eh)$_3$ brought to 200° C. and then held for 60 min.
Figure 13:
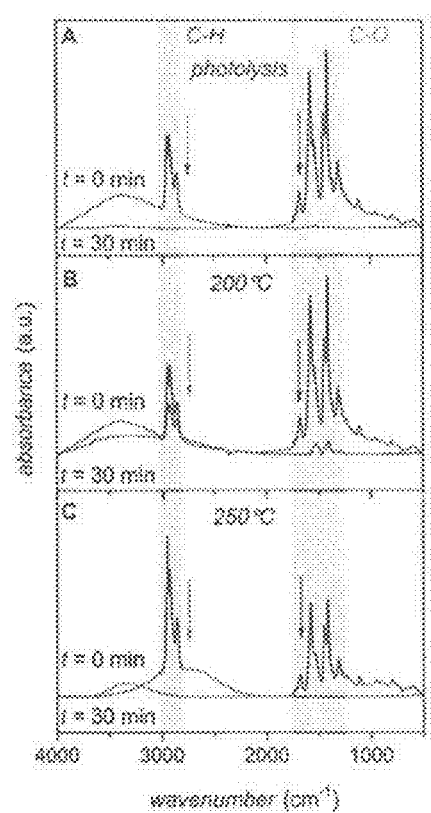
FIGS. 13A-C illustrate FTIR spectra of independent samples of Fe(eh)$_3$/FTO before and after (A) exposure to NIR radiation for 30 min, (B) heating at 200° C. in a furnace for 30 min, (C) heating at 250° C. in a furnace for 30 min.

This assessment is validated by the observations that: (i) substrates do not exceed 200° C. under the present experimental conditions (FIG. 5); (ii) bulk samples of FeCl$_3$ do not decompose to a mass corresponding to Fe$_2$O$_3$ until >300° C. (FIGS. 11 and 12); (iii) samples of precursors on FTO exposed to 1 h of constant irradiation yielded complete decomposition, while six successive 10-min segments of exposure separated by 5-min periods in the dark did not; and (iv) films of precursors on FTO did not show the same rates of decomposition when placed in an oven set at 200° C. (FIG. 13). FIG. 5 illustrates temperature profiles of FeCl$_3$/FTO, Fe(eh)$_3$/FTO and bare FTO. Additional control measurements were also collected on a sample where Fe(eh)$_3$ deposited directly on the copper wire of the thermocouple by the NIRDD process, denoted Fe(eh)$_3$/thermocouple, as well as the bare wire of the thermocouple. Temperature readings were recorded with a thermocouple in 5-min increments, and indicated a rise in temperature that plateaus at a value no greater than 175° C. These collective results confirm that a substrate temperature of 200° C. is not reached during a constant 1 h exposure to NIR radiation under the present experimental conditions.

FIG. 11 illustrates TGA and DSC profiles for (A) FeCl$_3$ and (B) Fe(eh)$_3$ under air and N$_2$ at a ramp rate of 10° C. min$^{-1}$. The bottom plots overlay the respective percent-mass-loss profiles in air and N$_2$ to highlight the effect of the atmospheric environment. Both FeCl$_3$ and Fe(eh)$_3$ appear to lose ligands in a stepwise fashion; our tentative assignments indicate that the first ligand is excluded at ~200° C. and the last ligand is liberated at ~400° C. The ligands are excluded from FeCl$_3$ in three distinct steps in both air and N$_2$, while data recorded on Fe(eh)$_3$ in air shows the loss of two ligands in quick succession followed by the loss of the third ligand at higher temperatures; this pattern is reversed under nitrogen. Complete decomposition is not complete until T>400° C. for any of the data shown, which is much higher than the surface temperatures reached during the NIRDD process. FIG. 12 illustrates TGA and DSC profiles for (A) FeCl$_3$ and (B) Fe(eh)$_3$ brought to 200° C. and then held for 60 min. The FeCl$_3$ and Fe(eh)$_3$ precursor complexes do not decompose fully to a final mass of Fe$_2$O$_3$ during this period. Both measurements were recorded in an aerobic environment. FIG. 13 illustrates FTIR spectra of independent samples of Fe(eh)$_3$/FTO before and after (A) exposure to NIR radiation for 30 min, (B) heating at 200° C. in a furnace for 30 min, (C) heating at 250° C. in a furnace for 30 min.

Figure 3:
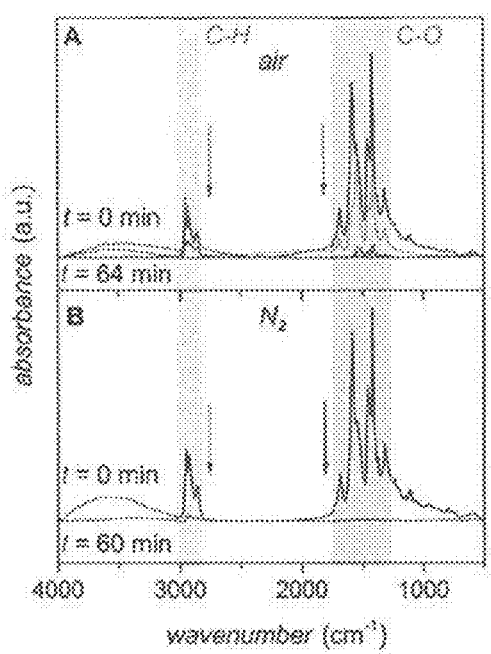
FIGS. 3A and B illustrate FTIR spectra for thin films of Fe(eh)$_3$ on FTO upon exposure to NIR radiation for (A) 0, 4, 16, 32 and 64 min in air, and (B) 0 and 60 min under nitrogen.
Figure 14:
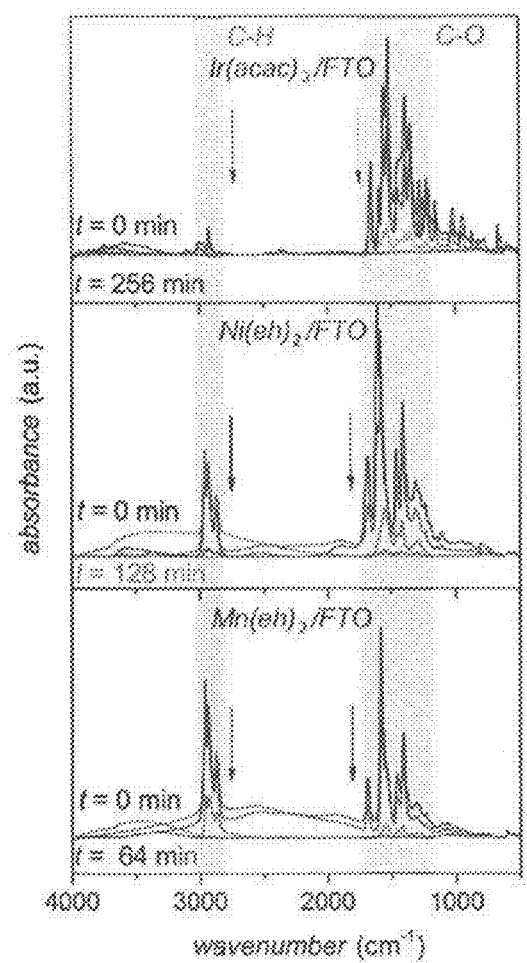
FIG. 14 illustrates FTIR spectra of thin films of Ir(acac)$_3$/FTO, Ni(eh)$_2$/FTO, and Mn(eh)$_3$/FTO subjected to the NIRDD process in accordance with the present invention for varying periods of time.

The temporal resolution of the NIRDD process was evaluated by tracking the formation of α-FeO$_x$ during the NIR-irradiation of Fe(eh)$_3$, which contains ligands that can be tracked by FTIR spectroscopy (17, 29), and indicated complete ligand loss within 1 h in both air and N$_2$ (FIG. 3). FIG. 3 illustrates FTIR spectra for thin films of Fe(eh)$_3$ on FTO upon exposure to NIR radiation for (A) 0, 4, 16, 32 and 64 min in air, and (B) 0 and 60 min under nitrogen. Arrows indicate trends in the intensities of the C—H and C—O vibrational modes of 2-ethylhexanoate. (8). [The absorption spectra (FIG. 6), lack of powder XRD reflections (FIG. 7), and electrochemical data (Table 1) collectively support the assignment of the resultant films as α-FeO$_x$.] Films of α-MO$_x$ (M=Ir, Ni, Mn) derived from Ir(acac)$_3$ (acac=acetylacetonate), Ni(eh)$_2$, and Mn(eh)$_2$, respectively, were formed quantitatively within four hours of irradiation (FIG. 14). FIG. 14 illustrates FTIR spectra of thin films of Ir(acac)$_3$/FTO, Ni(eh)$_2$/FTO, and Mn(eh)$_3$/FTO for 0, 4, 16, 64, 128, and 256 min subjected to the NIRDD process showing the progressive loss of ligands in <2 h. Absorption bands are associated with the symmetric and asymmetric vibrations of the C—O groups of the 2-ethylhexanoate ligand and free acid.

Example 2

Novel Synthesis of Metals (M) Using IR Irradiation Under Inert Atmosphere

The formation of α-FeO$_x$ from FeCl$_3$ signaled that oxygen in the films was sourced from the aerobic environment, thus raising the possibility that more reduced forms of amorphous films could be accessed by carrying out NIRDD in an inert atmosphere.

This hypothesis was tested by irradiating a film of FeCl$_3$ on FTO under nitrogen, which yielded a light grey film, denoted α-Fe, that did not produce any Bragg reflections (FIG. 7). Moreover, the electrochemistry of α-Fe on FTO in 0.1 M KOH$_{(aq)}$ was consistent with a lower average iron valency than that of α-FeO$_x$ (FIG. 2). As oxidative sweep of α-FeO$_x$ leads to a sharp rise in current at 1.55 V coincident with catalytic OER (FIG. 2A), and subsequent cycles over the 1.0-1.8 V range led to superimposable traces. The oxidative sweep for α-Fe featured a markedly different current profile (FIG. 2B); however, subsequent cycles indicated α-Fe was converted to α-FeO$_x$ upon oxidation in aqueous media on the basis of the superimposable scans. The differences in the reductive behavior were more stark, as the cathodic peak at −0.25 V for α-FeO$_x$ was not detected for α-Fe prior to HER catalysis at ca. −0.50 V. The two films could be interconverted: Holding α-FeO$_x$ at −0.68 V for 10 min yields a color change that matches that of α-Fe (grey), white maintaining α-Fe at 1.92 V for 10 min drives a color change towards that of α-FeO$_x$ (brown).

Figure 15:
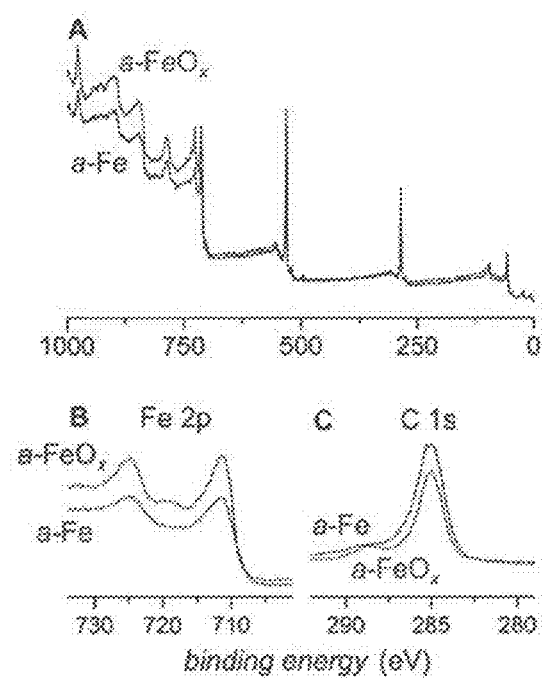
FIGS. 15A-C illustrate X-ray photoelectron spectra for α-FeO$_x$ and α-Fe on FTO.
Figure 16:
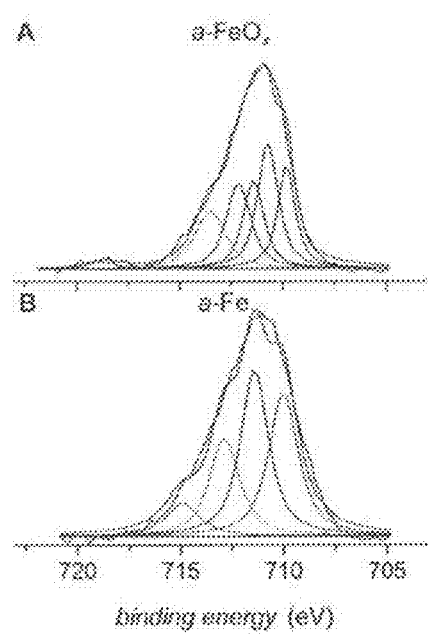
FIGS. 16A and B illustrate X-ray photoelectron spectra detailing the Fe 2p$_{3/2}$ region. Sums of the fitting components for (A) α-FeO$_x$ and (B) α-Fe are shown in red.

Evidence for the oxidized and reduced forms of the films being formed under oxygen and nitrogen environments, respectively, is further supported by the different absorption (FIG. 6) and X-ray photoelectron spectroscopy (XPS; FIGS. 15 and 16) data. FIG. 15 illustrates X-ray photoelectron spectra for α-FeO$_x$ and α-Fe on FTO. The (A) survey scan, and spectral regions corresponding to the (B) iron 2p and (C) carbon 1s regions, are shown. FIG. 16 illustrates X-ray photoelectron spectra detailing the Fe 2p$_{3/2}$ region. Sums of the fitting components for (A) α-FeO$_x$ and (B) α-Fe are shown. Curve fitting in A used Gupta Sen parameters based on Fe$_2$O$_3$ along with a surface peak and an Fe$^{3+}$ satellite peak. Curve fitting in B used centre-of-gravity peaks for Fe$^{2+}$ and Fe$^{3+}$; a surface peak and a Fe$^{2-}$ satellite peak are also shown. The Fe$^{3+}$ satellite peak is not shown, as it is likely superimposed with the Fe 2p$_{1/2}$ peak. The XPS data for α-FeO$_x$ contains a signature iron(III) satellite signal at 719 eV that is not observed for α-Fe, and an iron 2p$_{3/2}$ envelope that could be accurately modeled using peak parameters corresponding to Fe$_2$O$_3$ (30). The 2p$_{3/2}$ envelope of α-Fe was fit to a combination of iron(III), iron(II), and iron(0), where the zero valency was unequivocally implicated by the low-energy shoulder. While these results confirm that α-Fe exists in a more reduced form, the high susceptibility of the films to areal oxidation prevented confirmation that elemental iron was being formed is exclusivity during the NIRDD process.

Figure 4:
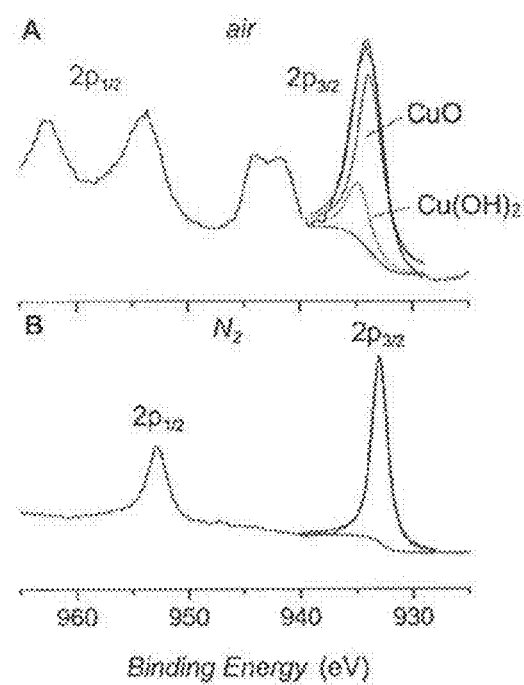
FIGS. 4A and B illustrate the fitting of the copper 2p$_{3/2}$ region of X-ray photoelectron spectra recorded on thin films of Cu(eh)$_2$ on FTO after being subjected to the NIRDD process under (A) air and (B) nitrogen, respectively, in accordance with the present invention.
Figure 17:
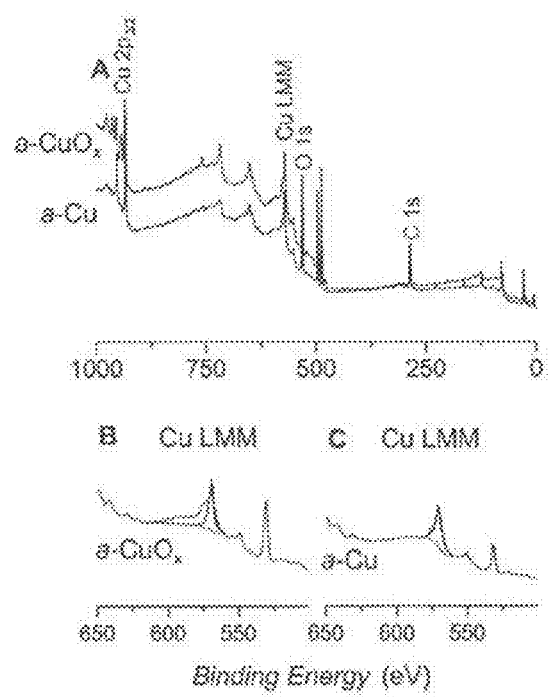
FIGS. 17A-C illustrate XPS data for α-CuO$_x$ and α-Cu on FTO.

Surrogate films of α-CuO$_x$ and α-Cu prepared by applying the NIRDD process to Cu(eh)$_2$ on FTO under air and nitrogen were analyzed, respectively, in view of elemental copper oxidizing less readily to $Cu_2O$ and, in turn, CuO (31). XPS data recorded on these samples did indeed yield different spectroscopic signatures (FIGS. 4 and 17): The copper $2p_{3/2}$ envelope for α-$CuO_x$ showed a mixture of CuO and $Cu(OH)_2$, while the same envelope for α-Cu shows a single peak corresponding to zero- or mono-valent copper sites. FIG. 4 illustrates the fitting of the copper $2p_{3/2}$ region of X-ray photoelectron spectra recorded on thin films of $Cu(eh)_2$ on FTO after being subjected to the NIRDD process under (A) air and (B) nitrogen, respectively; sum of the fitting components are indicated. Fitting of the data used centre-of-gravity peaks for (A) Cu(O) and $Cu(OH)_2$, and (B) Cu(1)/Cu(0). Signature copper(II) satellite peaks present in (A) but not (B) confirm a more reduced form of the film when prepared under nitrogen. The computed baselines are indicated. FIG. 17 illustrates XPS data for α-$CuO_x$ and α-Cu on FTO. The (A) survey scan, along with the rough fitting of the Cu LMM regions denoting (B) CuO and (C) $Cu_2O$, are shown.

Figure 18:
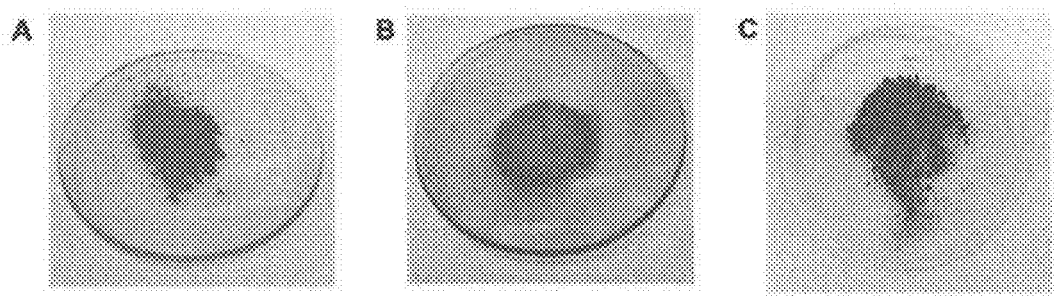
FIGS. 18A-C illustrate images of solid samples of (A) Cu(eh)$_2$, (B) Cu(eh)$_2$ subjected to NIRDD under nitrogen, and (C) Cu(eh)$_2$ subjected to NIRDD under air, in accordance with the present invention.
Figure 19:
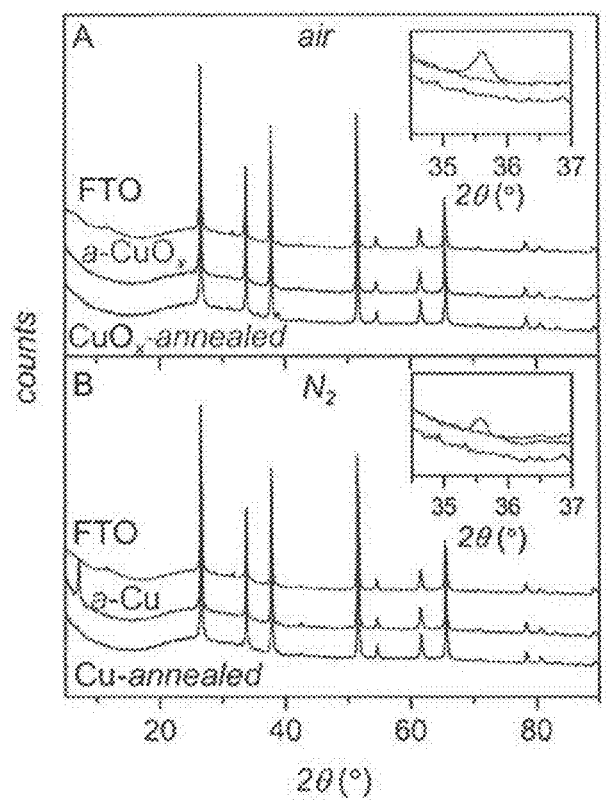
FIGS. 19A and B illustrate powder XRD patterns acquired on as-prepared and annealed (T$_{anneal}$=500° C.) α-CuO$_x$ and α-Cu films prepared from Cu(eh)$_2$ under (A) air and (B) nitrogen.

Visible inspection of the samples prepared by NIRDD in an inert atmosphere indicated a color consistent with elemental copper (FIG. 18), with XRD measurements ruling out formation of crystalline domains (FIG. 19), lending credence to the samples existing in a reduced form when prepared under nitrogen. FIG. 18 illustrates images of solid samples of (A) $Cu(eh)_2$, (B) $Cu(eh)_2$ subjected to NIRDD under nitrogen, and (C) $Cu(eh)_2$ subjected to NIRDD under air. The colors of the samples in (B) and (C) indicate elemental copper and copper oxide, respectively. FIG. 19 illustrates powder XRD patterns acquired on as-prepared and annealed ($T_{anneal}$=500° C.) α-$CuO_x$ and α-Cu films prepared from $Cu(eh)_3$ under (A) air and (B) nitrogen. Data recorded on bare FTO substrate is also included. Inset: Expanded view highlighting the region where the reflection associated with the crystalline form of CuO at 35.5° is observed. This signal is observed only for the films annealed at 500° C. under air and $N_2$, $CuO_x$-annealed and Cu-annealed.

Example 3

Novel Synthesis of Mixed-Metal Oxides (MMOx) Using IR Irradiation

Figure 20:
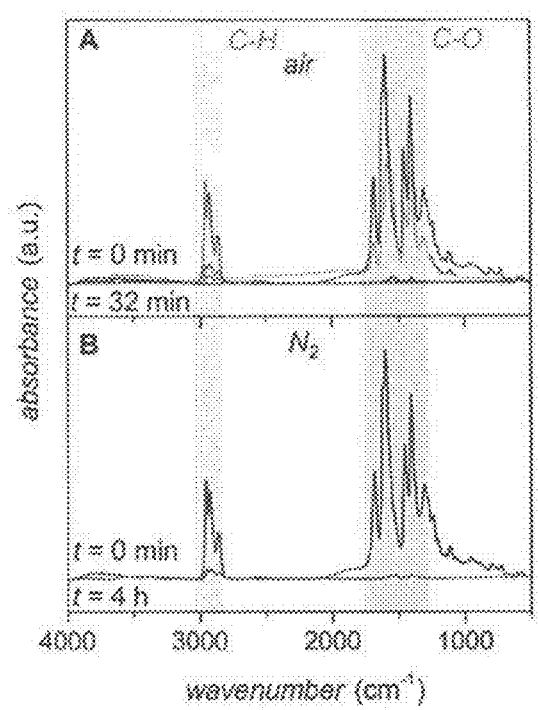
FIGS. 20A and B illustrate FTIR spectra of Fe$_2$Ni$_3$(eh)$_3$/FTO subjected to NIRDD for the times indicated under (A) air and (B) nitrogen to highlight the progressive loss in intensity of the bands associated with the ligand.
Figure 21:
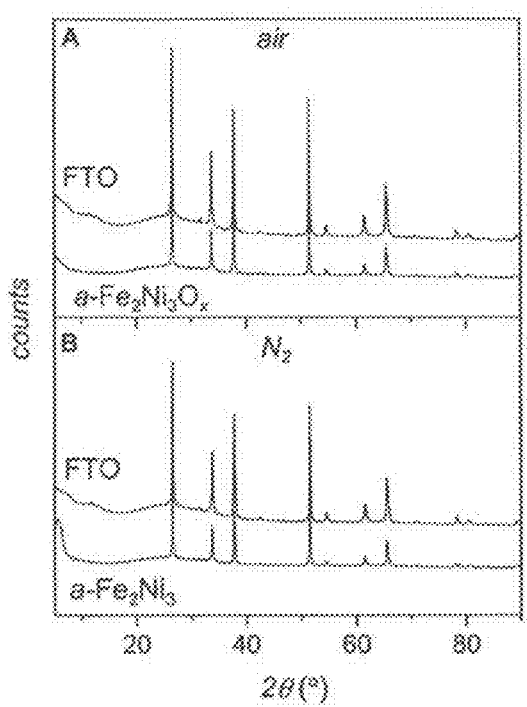
FIGS. 21A and B illustrate powder XRD patterns acquired on as-prepared films of (A) α-Fe$_2$Ni$_3$O$_x$ and (B) α-Fe$_2$Ni$_3$ on FTO recorded under air and nitrogen, respectively.
Figure 22:
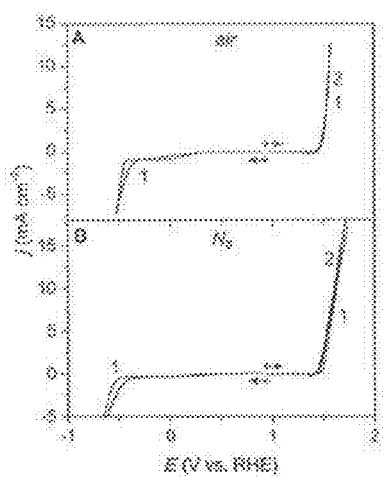
FIGS. 22A and B illustrate cyclic voltammograms for thin films of (A) α-Fe$_2$Ni$_3$O$_x$ and (B) α-Fe$_2$Ni$_3$ prepared by NIRDD under air and N$_2$, respectively.
Figure 32:
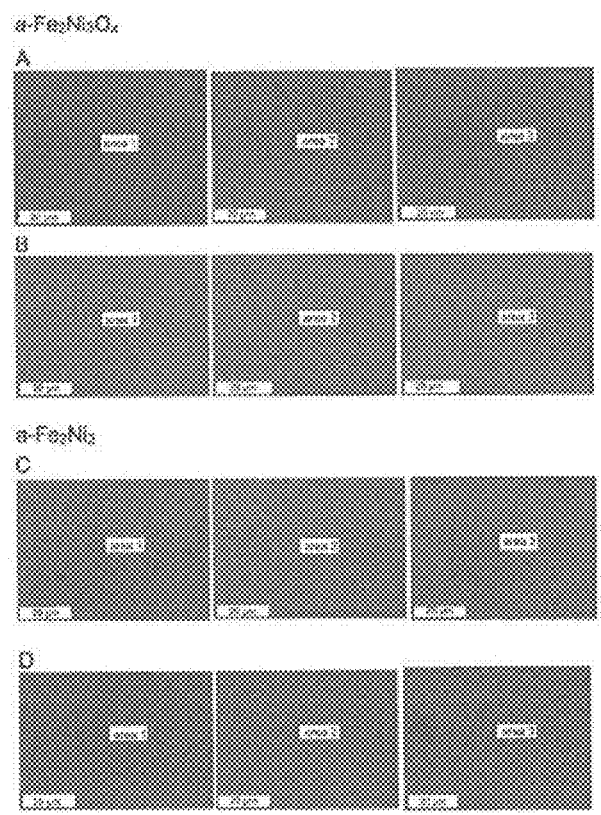
FIG. 32 depicts images of amorphous mixed metal and mixed metal oxide films prepared in accordance with the present invention.

Mixed-metal oxides are known to exhibit superior electrocatalytic behavior in basic media, which prompted the synthesis of the binary solid, α-$Fe_2Ni_3O_x$, by subjecting a mixture of iron precursors [e.g., $Fe(eh)_3$, $FeCl_3$ or $Fe(NO_3)_3$] and nickel precursors [$Ni(eh)_2$, $NiCl_2$ or $Ni(NO_3)_2$] (mol Fe/mol Ni 2:3) spin-cast on FTO to the NIRDD process (FIG. 20). FIG. 20A illustrates FTIR spectra of $Fe_2Ni_3(eh)_3$/FTO subjected to NIRDD for the times indicated under air to highlight the progressive loss in intensity of the bands associated with the ligand. In the spectra depicted in FIG. 20A, no peaks are present at 32 minutes. The resultant films were amorphous according to powder XRD measurements (FIG. 21A), and the EDX measurements recorded on different regions of the films confirmed uniform metal distributions across the substrates (FIG. 32 and Table 2). FIG. 21A illustrates powder XRD patterns acquired on as-prepared films of α-$Fe_2Ni_3O_x$ on FTO recorded under air. No reflections were observed other than those associated with FTO. The electrochemical behavior, including OER catalytic activity, also matches films of similar compositions prepared by other methods (FIG. 22A and Table 1), including the absence of an oxidative peak at $E_p$~1.45 V that is present in pure phases of $NiO_x$. FIG. 22A illustrates cyclic voltammograms for thin films of α-$Fe_2Ni_3O_x$ prepared by NIRDD under air. Electrochemistry conditions: Counterelectrode=Pt mesh; reference electrode=Ag/AgCl, KCl (sat'd); scan rate=10 mV s$^{-1}$; electrolyte=0.1 M $KOH_{(aq)}$; current densities were corrected for uncompensated resistance.

TABLE 2

Elemental Analysis of Amorphous $Fe_2Ni_3O_x$ Films Determined by EDX

| | FIG. 32 A | | FIG. 32 B | |
|---|---|---|---|---|
| area | % Fe | % Ni | % Fe | % Ni |
| 1 | 38.86 | 61.14 | 38.45 | 61.55 |
| 2 | 41.35 | 58.68 | 40.63 | 59.37 |
| 3 | 39.32 | 60.68 | 39.99 | 60.01 |
| average (at %) | 39.84 ± 1.32 | 60.16 ± 1.32 | 39.69 ± 1.12 | 60.31 ± 1.12 |
| nominal (at %)* | 43.34 | 56.66 | 43.34 | 56.66 |
| difference | −3.50 | +3.50 | −3.65 | +3.65 |

*Based on the relative molar ratios of metal nitrate films deposited on FTO glass; error bars represent the standard deviation between the three different areas of measurement on the surface

Example 4

Novel Synthesis of Mixed-Metal (MM) Using IR Irradiation Under Inert Atmosphere The binary film, α-$Fe_2Ni_3$, was prepared in the same manner as α-$Fe_2Ni_3O_x$, but under nitrogen. Alloy formation was corroborated by the electrocatalytic behavior of the films indicating a more reduced phase compared to that of α-$Fe_2Ni_3O_x$ (FIG. 22B). FIG. 20B illustrates FTIR spectra of $Fe_2Ni_3(eh)_3$/FTO subjected to NIRDD for the times indicated under nitrogen to highlight the progressive loss in intensity of the bands associated with the ligand. The resultant films were amorphous according to powder XRD measurements (FIG. 21B), and the EDX measurements recorded on different regions of the films confirmed uniform metal distributions across the substrates (FIG. 32). FIG. 21B illustrates powder XRD patterns acquired on as-prepared films of α-$Fe_2Ni_3$ on FTO recorded under nitrogen. No reflections were observed other than those associated with FTO. FIG. 22B illustrates cyclic voltammograms for thin films of (B) α-$Fe_2Ni_3$ prepared by NIRDD under $N_2$. Electrochemistry conditions: Counterelectrode=Pt mesh; reference electrode=Ag/AgCl, KCl (sat'd); scan rate=10 mV s$^{-1}$; electrolyte=0.1 M $HOH_{(aq)}$; current densities were corrected for uncompensated resistance. The alloy, which contains a uniform distribution of metals within the solid (FIG. 32 and Table 3), is not a state-of-the-art HER electrocatalyst but is superior to pure phases of α-Fe and α-Ni, thus highlighting that metal cooperativity with other metal combinations may unearth superior catalysts in future studies (7, 17, 32).

TABLE 3

Elemental Analysis of Amorphous $Fe_2Ni_3$ Films Determined by EDX

| | FIG. 32 C | | FIG. 32 D | |
|---|---|---|---|---|
| area | % Fe | % Ni | % Fe | % Ni |
| 1 | 41.55 | 58.45 | 39.87 | 60.13 |
| 2 | 37.95 | 62.05 | 40.37 | 59.61 |

TABLE 3-continued

Elemental Analysis of Amorphous
$Fe_2Ni_3$ Films Determined by EDX

| area | FIG. 32 C | | FIG. 32 D | |
|---|---|---|---|---|
| | % Fe | % Ni | % Fe | % Ni |
| 3 | 41.88 | 58.12 | 37.31 | 62.69 |
| average (at %) | 40.46 ± 2.18 | 59.54 ± 2.18 | 39.18 ± 1.65 | 60.81 ± 1.65 |
| nominal (at %)* | 43.34 | 56.66 | 43.34 | 56.66 |
| difference | −2.88 | +2.88 | −4.15 | +4.15 |

*Based on the relative molar ratios of metal nitrate films deposited on FTO glass; error bars represent she standard deviation between the three different areas of measurement on the surface Example 5

Synthesis of MOx on Plastic Using IR Irradiation

Figure 23:
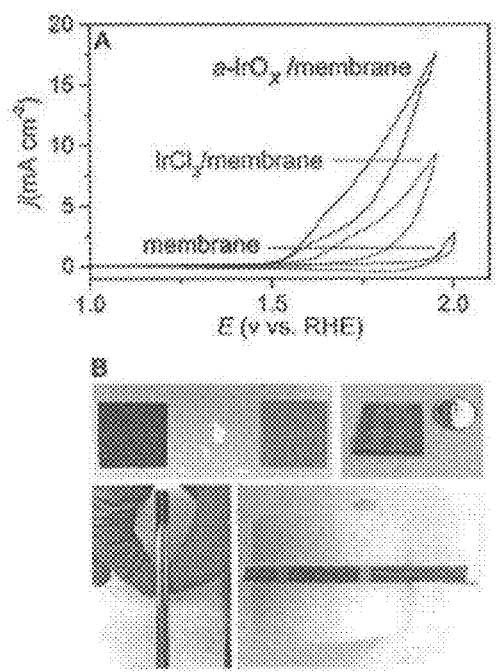
FIG. 23A illustrates cyclic voltammograms for thin films of α-IrO$_x$/membrane, IrCl$_3$/membrane, and the membrane, where the membrane is Nafion®.
FIG. 23B illustrates a membrane electrode assembly.
Figure 24:
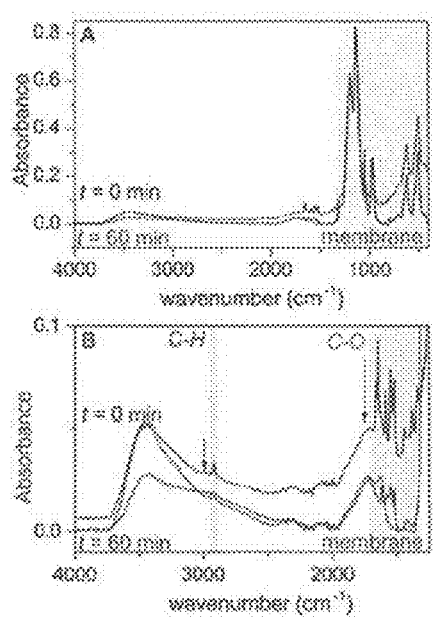
FIGS. 24A and B illustrate (A) full and (B) expanded FTIR spectra of Ir(acac)$_3$/membrane subjected to NIR radiation for 0 and 60 min. A trace for untreated Nafion membrane is also shown.
Figure 25:
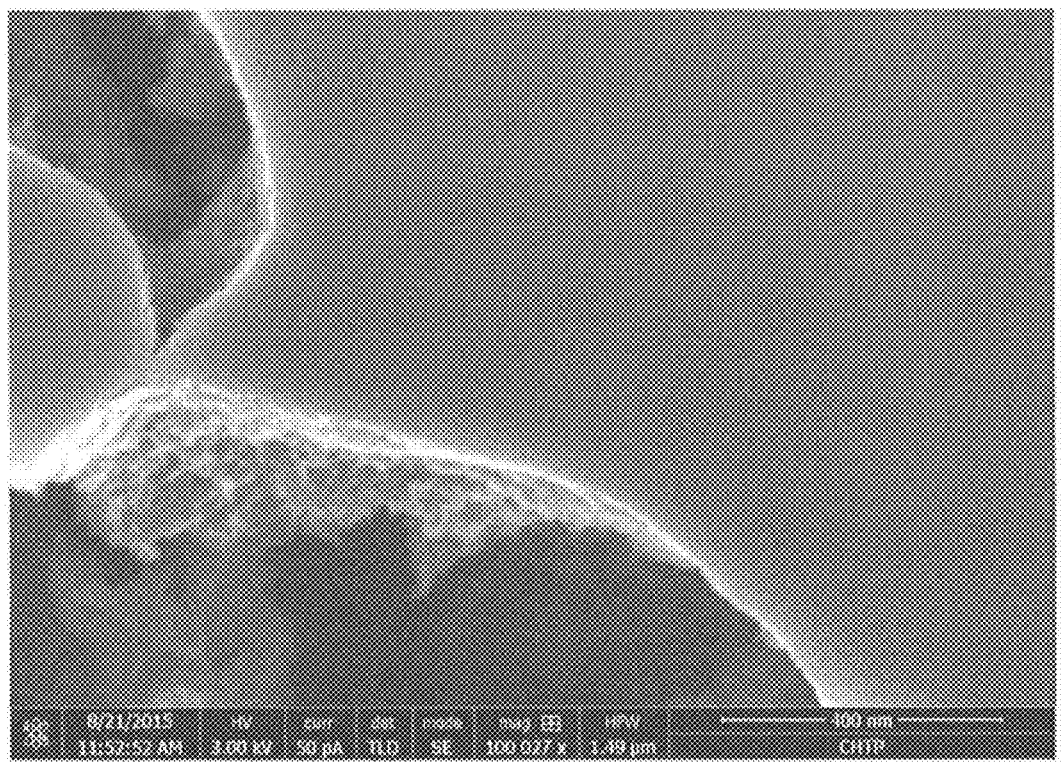
FIG. 25 is a scanning electron microscope (SEM) image of FeO$_x$ prepared in accordance with one embodiment of the present invention.

The viability of the NIRDD method for situations where the substrate is non-conducting, or sensitive to high temperatures (e.g., interfacial layers in solar cells, carbon-based substrates, etc.) was tested. Proof-of-principle experiments of relevance to electrolysis was designed where an 180-μm thick film of Nafion® was saturated with $IrCl_3$ or $Ir(acac)_3$, and subjected to the NIRDD process. The exclusive formation of amorphous $IrO_x$ within the Nafion was found within 60 min of irradiation, with no damage to the membrane, according to electrochemical and FTIR data (FIGS. 23 and 24). FIG. 23A illustrates cyclic voltammograms for thin films of α-$IrO_3$/membrane, $IrCl_3$/membrane, and the membrane, where the membrane is Nafion®. These results show that NIRDD may have the potential to efficiently coat three-dimensional electrodes, which is particularly important in contemporary electrolyzers. FIG. 23B illustrates the membrane electrode assembly prepared by mechanically pressing a platinum mesh counter electrode, the prepared Nafion membrane, and a Toray carbon paper gas diffusion layer between two Ti plate electrodes. The catalytic current with the blank membrane is due to the titanium plates mediating the OER reaction. Chronoamperometric measurements were done by holding the potential at 1.8 V for 3600 s. Electrochemistry conditions: counterelectrode=Pt mesh; reference electrode=Ag/AgCl, KCl (sat'd); scan rate=10 mV s$^{-1}$; electrolyte=0.5 M $H_2SO_{4(aq)}$; current densities were corrected for uncompensated resistance. FIG. 24 illustrates (A) full and (B) expanded FTIR spectra of $Ir(acac)_3$/membrane subjected to NIR radiation for 0 and 60 min. A trace for untreated Nafion membrane is also shown. The magnified spectrum in (B) is included to feature the loss in intensities of the bands associated with the ligand vibrational modes.

Materials

Iron(III) 2-ethylhexanoate ($Fe(eh)_3$, 50% w/w in mineral spirits,), iridium (III) acetylacetonate ($Ir(acac)_3$), nickel(II) 2-ethylhexanoate ($Ni(eh)_2$, 78% w/w in 2-ethylhexanoic acid,) manganese(III) 2-ethylhexanoate ($Mn(eh)_3$, 40% w/w in 2-ethylhexanoic acid), and copper(II) 2-ethylhexanoate ($Cu(eh)_2$) were purchased from Strem Chemicals. Nafion® N117 proton exchange membranes (177.8 μm thick) were purchased from Ion Power, ferric chloride (98%) anhydrous ($FeCl_3$) was purchased from Aldrich, iron (III) nitrate nonahydrate ($Fe(NO_3)_3 9H_2O$), nickel nitrate hexahydrate ($Ni(NO_3)_2 \cdot 6H_2O$) and nickel chloride hexahydrate ($NiCl_2 6H_2O$) were purchased from Fischer Scientific. All reagents were used without further purification.

Film Syntheses

Example 6

α-$FeO_x$ on FTO (or Glass)

To a 20-mL beaker containing 0.58 g of $Fe(eh)_3$ (0.66 mmol) was added to 1.07 g hexanes (12.4 mmol). The solutions were then spin-cast onto FTO (or glass) at 3000 rpm for 1 min. The resultant film, $Fe(eh)_3$FTO (or $Fe(eh)_3$/glass), was left under a NIR lamp for 30 min. The following conditions for this "NIRDD" process were used for each experiment unless otherwise stated: the samples were placed underneath a Phillips 175 W NIR lamp, where the bottom of the lamp was positioned 2 cm above the substrate that was set on an aluminum foil surface to help dissipate the heat; the face of the active film was positioned towards the lamp for this process.

Alternative Methods: Films were also prepared from $FeCl_3$ (0.24 g) or $Fe(NO_3)_3$ (0.11 g) in deionized water (2 g), that were spin-cast on FTO to form $FeCl_3$/FTO and $Fe(NO_3)_3$/FTO, respectively, and subject to the NIRDD process described above to form α-$FeO_x$. Samples prepared on glass were prepared using the same protocol as those prepared on FTO. FIG. 29 is an SEM image of $FeO_x$ prepared according to this process.

Example 7

α-Fe on FTO (or Glass)

The films were prepared following the same protocol as α-$FeO_x$, except the subsequent photolysis step being carried out in an MBraun Labmaster 310 glove box filled with nitrogen.

Example 8

α-$FeO_x$-Annealed

Films of α-$FeO_x$ on FTO were annealed in a furnace at 500° C. for 60 min.

Example 9

α-Fe-Annealed

Films of α-Fe on FTO were annealed for 60 min on a hot plate set at 500° C. inside the glove box. The temperature of the hot plate was confirmed with a Fluke 52 thermocouple.

Example 10

α-$IrO_x$ on FTO (or Glass)

Figure 28:
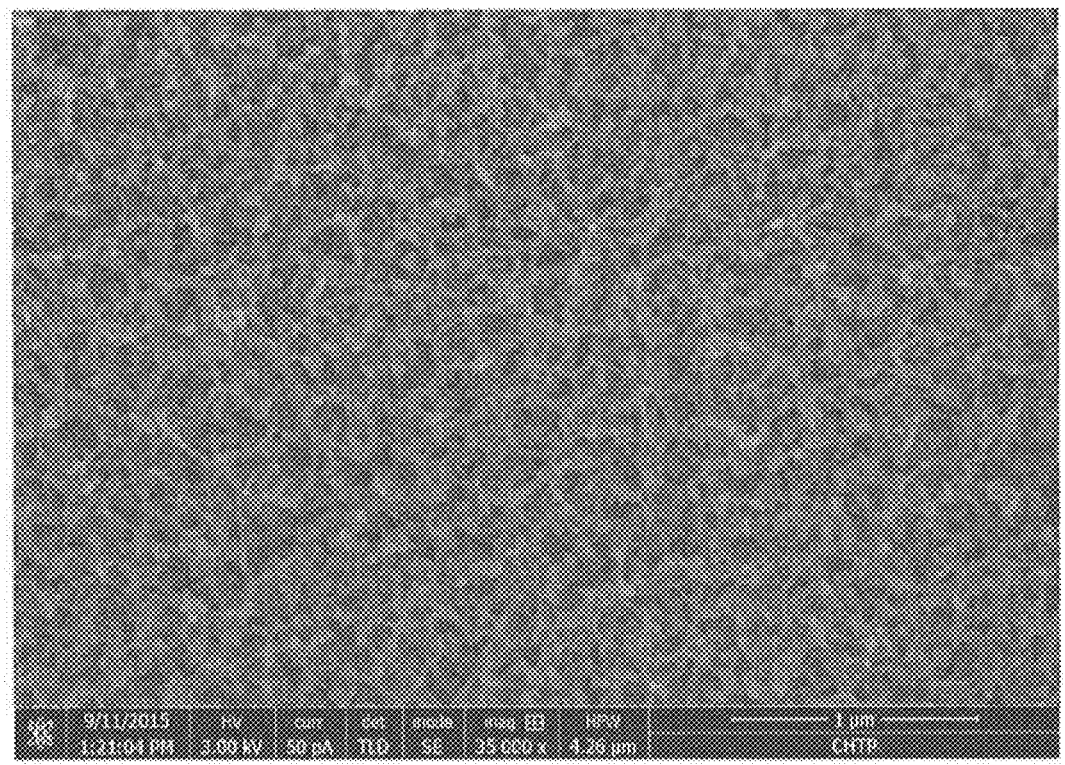
FIG. 28 illustrates an SEM image of IrO$_x$ prepared in accordance with one embodiment of the present invention.

To a 20-mL beaker containing 0.09 g of $Ir(acac)_3$ (0.3 mmol) was added 1.48 g chloroform. The solution was spin-cast onto the substrates (glass or FTO) at 3000 rpm for 1 min. The resultant film, $Ir(acac)_3$/FTO, was subject to the NIRDD process for 2 h to ensure the reaction was completed. FIG. 28 is an SEM image of $IrO_x$ prepared according to this process.

Example 11

α-$NiO_x$ on FTO (or Glass)

Figure 26:
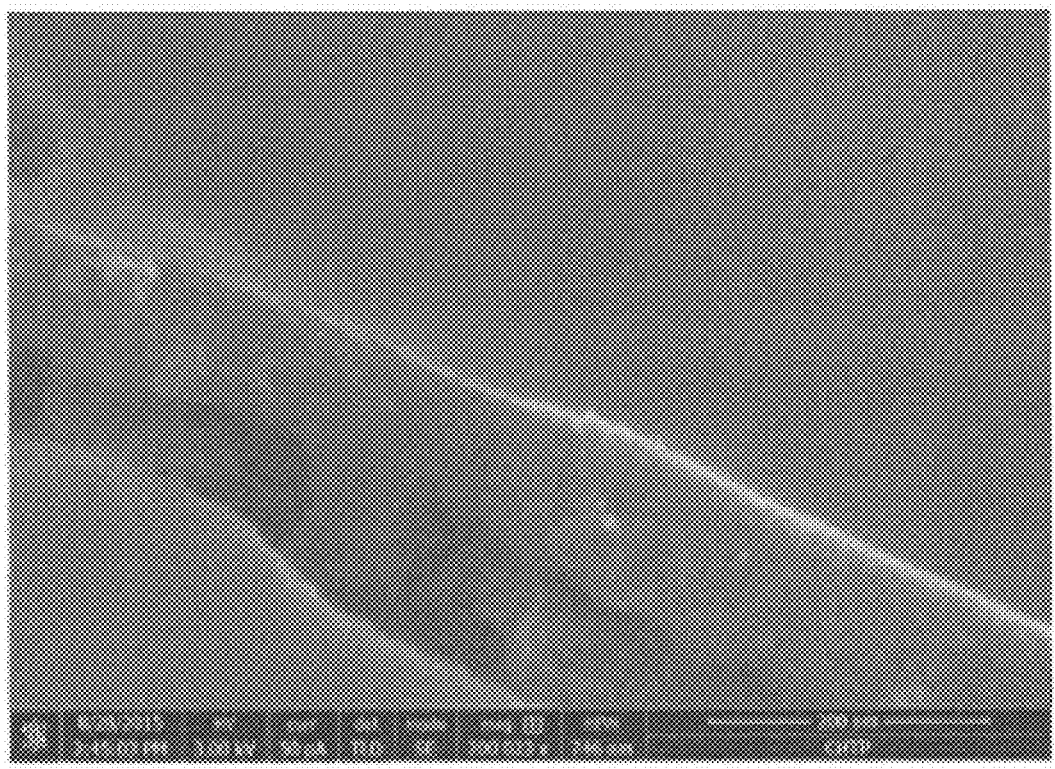
FIG. 26 illustrates an SEM image of NiO$_x$ prepared in accordance with one embodiment of the present invention.

To a 20-mL beaker containing 0.27 g of $Ni(eh)_2$ (0.61 mmol) was added to 1.26 g hexanes (14.6 mmol). The solutions were then spin-cast onto the substrates (glass or FTO) at 3000 rpm for 1 min. The resultant film, Ni(eh)$_2$/FTO, was subject to the NIRDD process until the reaction was complete (~60 min). FIG. 26 is an SEM image of NiO$_x$ prepared according to this process.

Alternative Methods: Films were also prepared from NiCl$_2$ (0.17 g) or Ni(NO$_3$)$_2$ (0.14 g) in deionized water (2 g), that were spin-cast on FTO to form NiCl$_2$/FTO and Ni(NO$_3$)$_3$/FTO, respectively, and then subject to the NIRDD process to form α-NiO$_x$ on FTO (~30 min).

Example 12

α-MnO$_x$ on FTO (or Glass)

To a 20-mL beaker containing 0.55 g of Mn(eh)$_3$ (0.64 mmol) was added to 1.06 g of hexanes (12.3 mmol). The solutions were then spin-cast onto FTO at 3000 rpm for 1 min. The resultant film, Mn(eh)$_3$/FTO, was then subject to the NIRDD process to form α-MnO$_x$ on FTO (~30 min).

Example 13

α-CuO$_x$ on FTO (or Glass)

Figure 31:
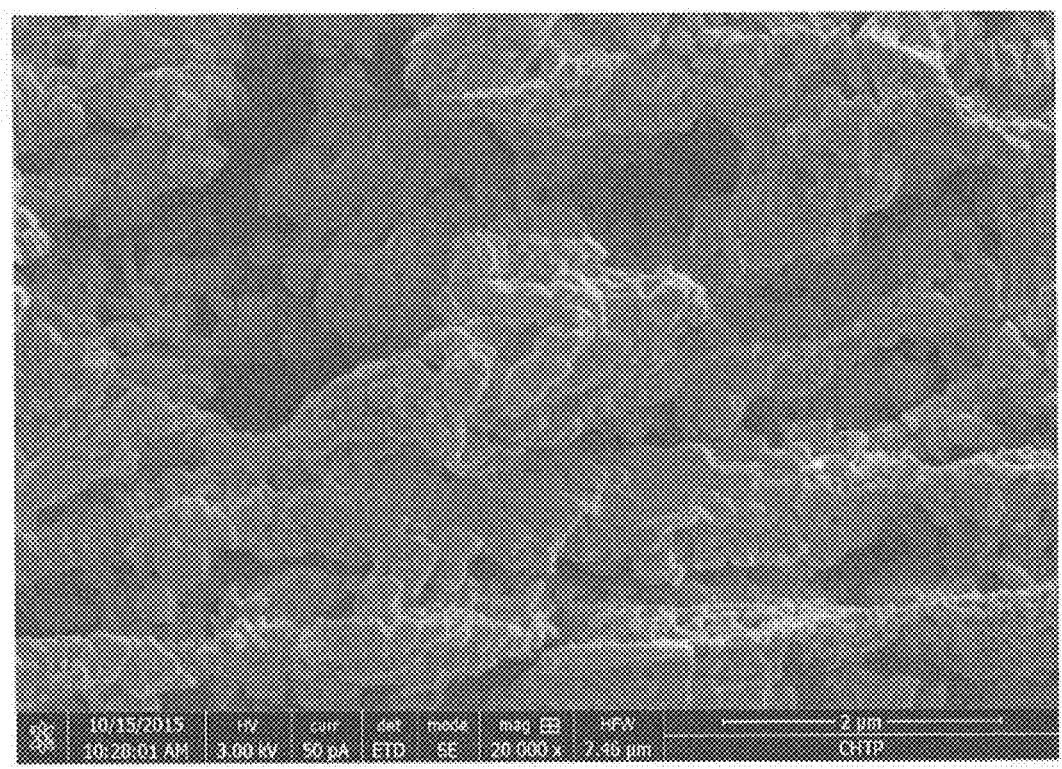
FIG. 31 illustrates an SEM image of CuO$_x$ prepared in accordance with one embodiment of the present invention.

To a 20 mL beaker containing 0.21 g Cu(eh)$_2$ (0.65 mmol) was added to 1.62 g ethanol (35.2 mmol). The solutions were then spin-cast onto FTO at 3000 rpm for 1 min. The resultant film, Cu(eh)$_2$/FTO, was then subject to the NIRDD process to form α-CuO$_x$ on FTO (~30 min). FIG. 31 is an SEM image of CuO$_x$ prepared according to this process Alternative Methods: Films were also prepared from a 0.3 M solution of CuCl$_2$ in methanol spin-cast on FTO and subject to the NIRDD process as described above to form α-CuO$_x$.

Example 14

α-CoO$_x$ on FTO (or Glass)

Figure 27:
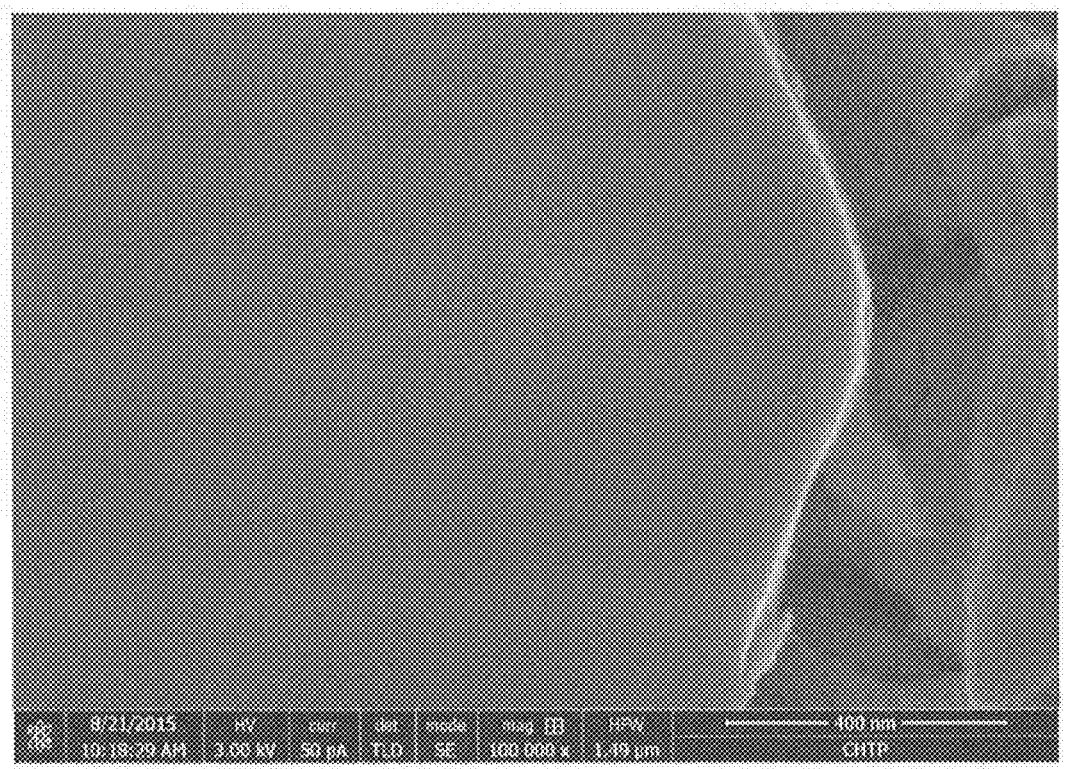
FIG. 27 illustrates an SEM image of CoO$_x$ prepared in accordance with one embodiment of the present invention.

A 0.3 M solution of Co(eh)$_2$ was prepared in hexanes. The solution was then spin-cast onto FTO at 3000 rpm for 1 min. The resultant film, Co(eh)$_2$/FTO, was then subject to the NIRDD process to form α-CoO$_x$ on FTO (~30 min to 2 h). FIG. 27 is an SEM image of CoO$_x$ prepared according to this process.

Alternative Methods: Films wore also prepared from a 0.3 M solution of CoCl$_2$ in methanol spin-cast on FTO and subject to the NIRDD process as described above to form CoO$_x$.

Example 15

α-MoO$_x$ on FTO (or Glass)

A 0.3 M solution of Mo(eh)$_2$ was prepared in hexanes. The solution was then spin-cast onto FTO at 3000 rpm for 1 min. The resultant film, Mo(eh)$_2$/FTO, was then subject to the NIRDD process to form α-MoO$_x$ on FTO (~30 min to 2 h).

Example 16

α-SnO$_x$ on FTO (or Glass)

A 0.3 M solution of Sn(eh)$_2$ was prepared in methanol. The solution was then spin-cast onto FTO at 3000 rpm for 1 min. The resultant film, Sn(eh)$_2$/FTO, was then subject to the NIRDD process to form α-SnO$_x$ on FTO (~30 min to 2 h).

Example 17

α-InO$_x$ on FTO (or Glass)

A 0.3 M solution of In(acac)$_3$ was prepared in methanol. The solution was then spin-cast onto FTO at 3000 rpm for 1 min. The resultant film, In(acac)$_3$/FTO, was then subject to the NIRDD process to form α-InO$_x$ on FTO (~30 min to 2 h).

Example 18

α-RuO$_x$ on FTO (or Glass)

Figure 30:
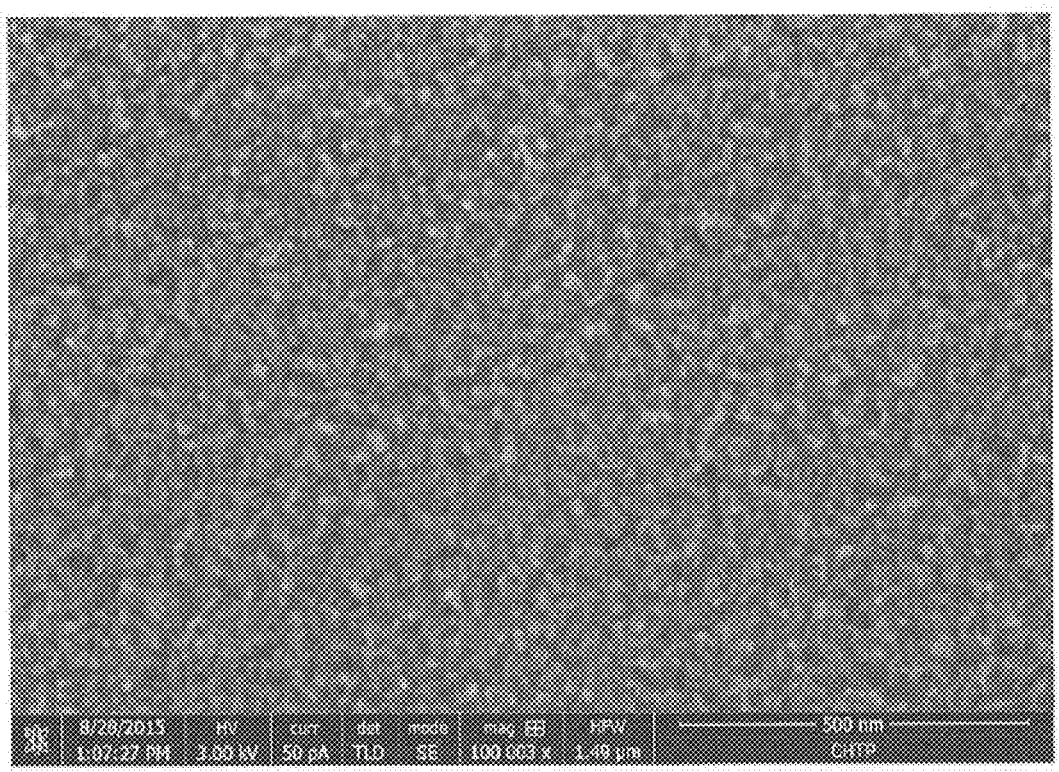
FIG. 30 illustrates an SEM image of RuO$_x$ prepared in accordance with one embodiment of the present invention.

A 0.3 M solution of RuCl$_3$ was prepared in methanol. The solution was then spin-cast onto FTO at 3000 rpm for 1 min. The resultant film, RuCl$_3$/FTO, was then subject to the NIRDD process to form α-RuO$_x$ on FTO (~30 min to 2 h). FIG. 30 is an SEM image of RuO$_x$ prepared according to this process.

Example 19

α-WO$_x$ on FTO (or Glass)

A 0.3 M solution of WCl$_6$ was prepared in methanol. The solution was then spin-cast onto FTO at 3000 rpm for 1 min. The resultant film, WCl$_6$/FTO, was then subject to the NIRDD process to form α-WO$_x$ on FTO (~30 min to 2 h).

Example 20

α-Fe$_2$Ni$_3$O$_x$ on FTO (or Glass)

To a 20-mL beaker containing 0.23 g of Fe(eh)$_3$ (0.24 mmol) and 0.16 g of Ni(eh)$_2$ (0.36 mmol) was added 1.28 g of hexanes (14.9 mmol). The mixture was spin-cast onto FTO at 3000 rpm for 1 min. The resultant film, FeNi(eh)/FTO, was then subject to the NIRDD process to form α-Fe$_2$Ni$_3$O$_x$ on FTO (~30 min).

Alternative Methods: Films were also prepared from a solution of NiCl$_2$ (0.088 g) [or Ni(NO$_3$)$_2$ (0.105 g)] and FeCl$_3$ (0.039 g) [or Fe(NO$_3$)$_3$ (0.097 g)] in deionized water (2 g) spin-cast on FTO and subject to the NIRDD process as described above to form α-Fe$_2$Ni$_3$O$_x$.

Example 21

α-Fe$_2$Ni$_3$ on FTO (or Glass)

Films of α-Fe$_2$Ni$_3$ on FTO were prepared in the same fashion as α-Fe$_2$Ni$_3$O$_x$, but the photolysis step was carried out in a glove box.

Example 22

α-IrO$_x$/Membrane

Nafion membranes were cut into squares with geometric surface areas of 6.25 cm$^2$ and then submerged in a bath of 3% w/w H$_2$O$_2$ stirring at 800 rpm for ~5 min. The membranes were then left to stand in a bath of stirring 0.5 M H$_2$SO$_4$ at 150° C. for 60 min. The membranes were dehydrated in a vacuum oven (room temperature, 0.8 atm) for at least 5 h. Excess acid was removed before dehydration with compressed nitrogen. A solution containing 0.016 g of Ir(acac)$_3$ (0.32 mmol) in 3.2 ml ethanol was then spray-coated on the surface of the dehydrated Nafion to form Ir(acac)$_3$/membrane. The resultant film was then subjected to the NIRDD process to form α-IrO$_x$/membrane (~120 min). Similar substrates could be prepared by immersing the Nafion into a 2-mL solution prepared from a bulk solution of 1.0 g of IrCl$_3$ H$_2$O (2.8 mmol) in 28 mL H$_2$O.

Physical Methods

Example 23

Electrochemical measurements were performed on a C—H Instruments Workstation 660D potentiostat. The Ag/AgCl (sat. KCl) reference electrode (E$_{ref}$) was calibrated regularly against a 1-mM aqueous K$_3$[Fe(CN)$_6$] solution. Cyclic voltammograms were acquired at a 10 mV s$^{-1}$ scan rate unless otherwise indicated. All potentials were corrected for uncompensated resistance (R$_u$) and are reported relative to the reversible hydrogen electrode (vs RHE), E$_{RHE}$=E+E$_{ref}$=0.059(pH)−iR$_u$. Tafel plots were acquired through staircase voltammetry (10 mV steps, 50 s intervals for the final 25 s sampled). For the metal oxide and metal films on FTO, all experiments were carried out using 0.1 M KOH as an electrolyte, unless otherwise noted, in a standard three-compartment electrochemical cell. A Luggin capillary connects the reference and working electrodes while a porous glass frit connects the working electrode to the platinum mesh counter electrode. All experiments involving Nafion were carried out in 0.5 M H$_2$SO$_4$. Membranes were hydrated in 0.2 M H$_2$SO$_4$ prior to electrochemical experiments. Measurements were performed in a customized three-electrode test cell using the above Ag/AgCl reference electrode. All potentials were corrected for R$_u$. The membrane electrode assembly (MEA) was prepared by mechanically pressing a platinum mesh counter electrode (Aldrich), the prepared Nafion membrane, and a Toray carbon paper gas diffusion layer (Ion Power) between two Ti plate electrodes (McMaster Carr). No aggregation was induced on the test cell besides that from evolved gaseous products. Powder X-ray diffraction (XRD) data was recorded with a Bruker D8 Advance diffractometer using Cu Kα radiation. Data was collected between 2θ angles of 5° and 90° with a step size of 0.04°. The step time was 0.6 s unless otherwise indicated. Thermogravimetric Analysis and Differential Scanning Calorimetry (TGA/DSC) measurements were collected simultaneously with a PerkinElmer Simultaneous Thermal Analyzer (STA) 6600. These measurements were carried out under both air and N$_2$ at a 20-mL min$^{-1}$ flow rate. Starting from a temperature of 50° C., the temperature was ramped up (10° C. min$^{-1}$) until 100° C. where it was held for one minute. It was then ramped at 10° C. min$^{-1}$ until a final temperature of 500° C. was reached and held for an additional minute. For constant temperature measurements, the temperature was ramped up (10° C. min$^{-1}$) until 200° C. where it was held for 60 minutes. UV-vis absorption spectroscopy on fresh and on metal oxide films was performed using a Perkin Elmer Lambda 35 UV-vis spectrometer with a solid sample holder accessory. Baseline scans were performed with clean glass. X-ray photoelectron spectroscopy (XPS) measurements were collected on a Leybold MAX200 spectrometer using Al K-alpha radiation. The pass energy used for the survey scan was 192 eV while for the narrow scan it was 48 eV. Scanning electron microscopy (SEM) and energy dispersive X-ray spectroscopy (EDX) measurements were carried out on a FEI Helios NanoLab 650 dual beam scanning electron microscope with an EDAX Pegasus system with EDS detector. The magnification was set to 2000×, the accelerating voltage was set to 2.0 KeV, the current was set to 51 nA and the working distance was 9 mm.

Example 24

The temperature of the substrates was tracked with a Fluke 52 thermocouple attached to a multimeter. For the FTO measurements, constant contact of the tip of the defector was maintained throughout the experiment. For the thermocouple measurements, the tip of the detector was dipped in Fe(eh)$_3$. The substrate & thermocouple was placed 2 cm from the lamp. Temperature values were recorded every 5 mm.

Example 25

All amorphous film examples could also be fabricated on different substrates including fluorine doped tin oxide (FTO), glass, copper, titanium, Nafion membrane, plastic and glassy carbon using the same protocols as described in the examples above.

It will be understood by those of skill in the art that the scope of the claims should not be limited by the preferred embodiments set forth in the examples, but should be given the broadest interpretation consistent with the description as a whole.

REFERENCES

1. K. Nomura, H. Ohta, A. Takagi, T. Kamiya, M. Hirano, H. Hesono, Room-temperature fabrication of transparent flexible thin-film transistors using amorphous oxide semiconductors, *Nature* 432, 488-492 (2004).
2. Y.-H. Kim, J.-S. Heo, T.-H. Kim, S. Park, M.-H. Yoon, J. Kim, M. S. Oh, G.-R. Yi, Y.-Y. Noh, S. K. Park, Flexible metal-oxide devices made by room-temperature photochemical activation of sol-gel films. *Nature* 489, 128-132 (2013).
3. M. G. Kim. M. G. Kanatzidis, A. Facchetti, T. J. Marks, Low-temperature fabrication of high-performance-metal oxide thin-film electronics via combustion processing. *Nat. Mater.* 10, 382-388 (2011).
4. M. W. Kanan, D. G. Nocera, In situ formation of an oxygen-evolving catalyst in neutral water containing phosphate and Co$^{2+}$, *Science* 321, 1072-1075 (2008).
5. D. K. Zhong, J. Sun, H. Inumaru, D. R. Gamelin, Solar water oxidation by composite catalyst/α-Fe$_2$O$_3$ photoanodes, *J. Am. Chem. Soc.* 131, 6086-6087 (2009).
6. I. Zaharieva, M. M. Najafpour, M. Wiechen, M. Haumann, P. Kurz, H. Dau, Synthetic manganese-calcium oxides mimic the water-oxidizing complex of photosynthesis functionally and structurally. *Energy Environ. Sci.* 4, 2400-2408 (2011).
7. L. Trotochaud, S. L. Young, J. K. Ranney, S. W. Boettcher, Nickel-iron oxyhydroxide oxygen-evolution electocatalysts: the Role of intentional and incidental iron incorporation, *J. Am. Chem. Soc.* 136, 6744-6753 (2014).
8. R. D. L. Smith, M. Prévot, R. D. Fagan, Z. Zhang, P. A. Sedach, M. K. J. Siu, S. Trudel, C. P. Berlinguette, Photochemical route for accessing amorphous metal oxide materials for water oxidation catalysts. *Science* 340, 60-63 (2013).
9. J. D. Benck, Z. Chen, L. Y. Kuritzky, A. J. Forman, T. F. Jaramillo, Amorphous Molybdenum sulfide catalysts for electrochemical hydrogen production: insights into the origin of their catalytic activity. *ACS Catal.* 2, 1916-1923 (2012).
10. D. Merki, S. Fierro, H. Vrubel, X. Hu, Amorphous molybdenum sulfide films as catalysts for electrochemical hydrogen production in water. *Chem. Sci.* 2, 1262-1267 (2011).
11. N. S. Lewis, D. G. Nocera, Powering the planet: chemical challenges in solar energy utilization. *Proc. Natl. Acad. Sci.* 103, 15729-15735 (2006).
12. T. R. Cook, D. K, Dogutan, S. Y. Reece, Y. Surendranath, T. S. Teets, D. G. Nocera, Solar energy Supply and storage for the legacy and nonlegacy worlds. *Chem. Rev.* 110, 6474-6502 (2010).
13. J. F. Peirson, D. Wiederkehr, A. Billard, Reactive magnetron sputtering of copper, silver, and gold. *Thin solid Films* 478 196-205 (2005).
14. D. Merki, H. Vrubel, L. Rovelli, S. Fierro, X. Hu, Fe, Co, and Ni ions promote the catalytic activity of amorphous molybdenum sulfide films for hydrogen evolution. *Chem. Sci.* 3, 2515 (2012).
15. C. C. L. McCrory, S. Jung, J. C. Peters, T. F. Jaramillo, Benchmarking heterogeneous electrocatalysts for the oxygen evolution reaction. *J. Am. Chem. Soc.* 135, 16977-16987 (2013).
16. L. Trotochaud, J. K. Ranney, K. N. Williams, S. W. Roettcher, Solution-cast metal oxide thin film electrocatalysts for oxygen evolution. *J. Am. Chem. Soc.* 134, 17253-17261 (2012).
17. R. D. L. Smith, M. S. Prevot, R. D. Fagan, S. Trudel, C. P. Berlinguette, Water oxidation catalysts: electrocatalytic response to metal stoichiometry in amorphous metal oxide films containing iron, cobalt, and nickel. *J. Am. Chem. Soc.* 135, 11580-11586 (2013).
18. R. D. L. Smith, B. Sperinova, R. D. Fagan, S. Trudel, C. P. Berlinguette, Facile photochemical preparation of amorphous iridium oxide films for water oxidation catalysis. *Chem. Mater.* 26, 1654-1659 (2014).
19. J. Luo, J.-K. Im, M. T. Mayer, M. Schreier, M. K. Nazeeruddin, N.-G. Park, S. D. Tilley, H. J. Fan, M. Grätzel, Water photolysis at 12.3% efficiency via perovskite photovoltaics and Earth-abundant catalysts. *Science* 345, 1593-1596 (2014).
20. C. Du, X. Yang, M. T. Mayer, H. Hoyt, J. Xie, G. McMahon, G. Bischoping, D. Wang, Hematite-based water splitting with low turn-on voltages, *Angew. Chem. Int. Ed.* 52, 12692-12695 (2013).
21. L., Zhong, J. Wang, H. Sheng, Z. Zhang, S. X. Mao, Formation of monatomic metallic glasses through ultrafast liquid quenching, *Nature* 512, 177-180 (2015).
22. K. Knischk, U. Lehmann, U. Stadler, M. Mamak, J. Benkhoff, Novel approaches in NIR curing technology, *Prog. Org. Coat.* 64, 171-174 (2009).
23. J. P. Kyung, I. W. Dae, Development of infrared ray curing technology at continuous coil coating line. *Mat. Sci. Forum* 654-656, 1819-1822 (2010).
24. J. D. Blakemore, N. D. Schley, G. W. Olack, C. D. Incarvito, G. W. Brudvig, R. H. Crabtree, Anodic deposition of a robust iridium-based water-oxidation catalyst from organometallic precursors, *Chem. Sci.* 2, 94 (2011).
25. M. Huynh, D. K. Bediako, D. G. Nocera, A functionally stable manganese oxide oxygen evolution catalyst in acid. *J. Am. Chem. Soc.* 140411153640002 (2014).
26. A. Singh, L. Spiccia, Water oxidation catalysts based on abundant 1st row transition metals. *Coord. Chem. Rev.* 257, 2607-2622 (2013).
27. A. Paracchino, V. Laporte, K. Sivula, M. Grätzel, E. Thinasen, Highly active oxide photocathode for photoelectrochemical water reduction. *Nat. Mater.* 10, 456-461 (2011).
28. X. Liu, H. Jia, Z. Sun, H. Chen, P. Xu, P. Du. Nanostructured copper oxide electrodeposited from copper (II) complexed as an active catalyst for electrocatalytic oxygen evolution reaction. *Electrochem. Commun.* 46, 1-4 (2014).
29. L. S. Andronic, R. H. Hill, the mechanism of the photochemical metal organic deposition of lead oxide films from thin films of lead (II) 2-ethylhexanoate. *J. Photochem. Photobiol. A-Chem.* 152, 259-265 (2002).
30. A. P. Grosvenor, B. A. Kobe, M. c. Biesinger, N. S. McIntyre, Investigation of multiplet splitting of Fe 2p XPS spectra and bonding in iron compounds. *Surf. Interface Anal.* 36, 1564-1574 (2004).
31. I. Platzman, R. Brener, M. Haick, R. Tannenbaum. Oxidation of polycrystalline copper thin films at ambient conditions, *J. Phys. Chem. C* 112, 1101-1108 (2008).
32. M. W. Louie, A. T. Bell, An investigation of thin-film Ni—Fe oxide catalysts for the electrochemical evolution of oxygen. *J. Am. Chem. Soc.* 135, 12329-12337 (2013).

We claim:

1. A process for forming an amorphous metal-containing electrocatalytic film, the process comprising the steps of:
    a) providing a substrate, wherein the substrate is glass, fluorine-doped tin oxide-coated glass, perfluorinated polymer membrane, a synthetic polymer, a metallic substrate, plastic, glassy carbon or stainless steel;
    b) coating the substrate with a metal precursor solution; and
    c) exposing the coated substrate to near-infrared radiation to form the amorphous metal-containing film.

2. The process according to claim 1, wherein the amorphous metal-containing film is an amorphous metal oxide, an amorphous mixed metal oxide, an amorphous metal, or an amorphous mixed metal.

3. The process according to claim 1, wherein the amorphous metal-containing film comprises a metal selected from iron, iridium, manganese, nickel, copper, ruthenium, cobalt, tungsten, indium, tin, molybdenum, or any combination thereof.

4. The process according to claim 1, wherein the metal precursor is a metal salt.

5. The process according to claim 4, wherein the metal salt is $MCl_x$ or $M(NO_3)_x$, where x is 2 or 3.

6. The process according to claim 4, wherein the metal salt is selected from the group consisting of $FeCl_3$, $Fe(NO_3)_3$, $IrCl_3$, $NiCl_2$, $Ni(NO_3)_2$, $Fe_2Ni_3Cl$, $CoCl_2$, $RuCl_3$, $CuCl_2$, and $WCl_6$.

7. The process according to claim 1, wherein the metal precursor is a metal coordination complex.

8. The process according to claim 7, wherein the metal coordination complex is a 2-ethylhexanoate derivative or an acetylacetonate derivative.

9. The process according to claim 7, wherein the metal coordination complex is selected from the group consisting of Fe(eh)3, Cu(eh)$_2$, lr(acac)3, Ni(eh)$_2$, Mn(eh)3, Co(eh)$_2$, Mo(eh)2, Sn(eh)2, In(acac)3, and Fe2Ni3(eh)3.

10. The process according to claim 1, wherein the step of exposing the coated substrate to near-infrared radiation is conducted in an oxidizing atmosphere.

11. The process according to claim 10, wherein the amorphous metal-containing film comprises α-$FeO_x$, α-$IrO_x$, α-$NiO_x$, α-$MnO_x$, -α-$Fe_2Ni_3O_x$ α-$CuO_x$, α-$CoO_x$, α-$MoO_x$, α-$SnO_x$, α$InO_x$, α-$RuO_x$, or α-$WO_x$.

12. The process according to claim 1, wherein the step of exposing the coated substrate to near-infrared radiation is conducted in an inert atmosphere.

13. The process according to claim 12, wherein the amorphous metal-containing film comprises α-Fe, α-Cu, α-Fe$_2$Ni$_3$, α-Ni, or α-Mn.

14. The process according to claim 1, further comprising the step of tuning the properties of the electrocatalytic film.

15. The process according to claim 14, wherein the tuning step comprises annealing the metal oxide film.

* * * * *

UNITED STATES PATENT AND TRADEMARK OFFICE
CERTIFICATE OF CORRECTION

PATENT NO. : 10,173,210 B2
APPLICATION NO. : 15/539074
DATED : January 8, 2019
INVENTOR(S) : Chris Berlinguette et al.

Page 1 of 1

It is certified that error appears in the above-identified patent and that said Letters Patent is hereby corrected as shown below:

In the Specification

Column 18, Line number 59-60: delete "Fe(eh)3, Cu(eh)$_2$, Ir(acac)3, Ni(eh)$_2$, Mn(eh)3, Co(eh)$_2$, Mo(eh)2, Sn(eh)2, In(acac)3, and Fe2Ni3(eh)3." add --Fe(eh)$_3$, Cu(eh)$_2$, Ir(acac)$_3$, Ni(eh)$_2$, Mn(eh)$_3$, Co(eh)$_2$, Mo(eh)$_2$, Sn(eh)$_2$, In(acac)$_3$, and Fe$_2$Ni$_3$(eh)$_3$.--

Column 18, Line number 66: delete "$a$-Fe$_2$Ni$_3$O$_x$ $a$-CuO$_x$" add --$a$-Fe$_2$Ni$_3$O$_x$, $a$-CuO$_x$--

Column 18, Line number 67: delete "$a$InO$_x$" add --$a$-InO$_x$--

Signed and Sealed this
Twenty-third Day of April, 2019

Andrei Iancu
*Director of the United States Patent and Trademark Office*